(12) United States Patent
Diehl

(10) Patent No.: US 7,631,139 B2
(45) Date of Patent: Dec. 8, 2009

(54) SYSTEM AND METHOD FOR PERSISTENT RAM DISK

(75) Inventor: Shawn T. Diehl, Mount Vernon, NH (US)

(73) Assignee: Superspeed Software, Sudbury, MA (US)

( * ) Notice: Subject to any disclaimer, the term of this patent is extended or adjusted under 35 U.S.C. 154(b) by 0 days.

(21) Appl. No.: 11/879,282

(22) Filed: Jul. 17, 2007

(65) Prior Publication Data

US 2008/0022036 A1   Jan. 24, 2008

Related U.S. Application Data

(62) Division of application No. 10/977,340, filed on Oct. 29, 2004, now Pat. No. 7,475,186.

(60) Provisional application No. 60/516,043, filed on Oct. 31, 2003.

(51) Int. Cl.
*G06F 12/00* (2006.01)
*G06F 13/00* (2006.01)

(52) U.S. Cl. .................. 711/104; 711/100; 711/154; 711/168

(58) Field of Classification Search ............. 711/100, 711/104, 154, 162, 163, 168
See application file for complete search history.

(56) References Cited

U.S. PATENT DOCUMENTS

| | | | |
|---|---|---|---|
| 4,698,749 A | 10/1987 | Bhadriraju | |
| 5,274,799 A * | 12/1993 | Brant et al. | 714/6 |
| 5,343,437 A * | 8/1994 | Johnson et al. | 365/230.03 |
| 5,353,422 A | 10/1994 | Kobayashi et al. | |
| 5,566,339 A | 10/1996 | Perholtz et al. | |
| 5,594,883 A * | 1/1997 | Pricer | 711/113 |
| 5,606,681 A | 2/1997 | Smith et al. | |
| 5,752,009 A | 5/1998 | Nakahara et al. | |
| 6,014,727 A * | 1/2000 | Creemer | 711/118 |
| 6,336,174 B1 | 1/2002 | Li et al. | |
| 6,370,615 B1 | 4/2002 | Percival | |
| 6,418,506 B1 * | 7/2002 | Pashley et al. | 711/103 |
| 6,629,201 B2 | 9/2003 | Dempsey et al. | |
| 6,988,193 B2 | 1/2006 | French et al. | |
| 7,313,706 B2 | 12/2007 | Williams et al. | |
| 2002/0188837 A1 | 12/2002 | Dayan et al. | |
| 2003/0005276 A1 | 1/2003 | French et al. | |
| 2003/0009657 A1 | 1/2003 | French et al. | |
| 2003/0093616 A1 | 5/2003 | Slavin | |
| 2003/0191912 A1 | 10/2003 | Dortu | |
| 2004/0044838 A1 | 3/2004 | Nickel et al. | |
| 2004/0177224 A1 | 9/2004 | Devaney et al. | |
| 2005/0193232 A1 | 9/2005 | Diehl | |

* cited by examiner

*Primary Examiner*—Tuan V. Thai
(74) *Attorney, Agent, or Firm*—Wilmer Cutler Pickering Hale & Dorr LLP

(57) ABSTRACT

The contents of a RAM disk are copied to an image file in nonvolatile memory on power-down and copied back on reboot to provide an appearance of persistence. A locking method can use in-use tables to limit access to the same blocks of data in a RAM disk.

7 Claims, 37 Drawing Sheets

DATA TYPES USED IN THE ACCOMPANYING FIGURES

VOID - null value
BOOLEAN - 1-bit value
WCHAR - signed 16-bit integer
LONG - signed 32-bit integer
ULONG - unsigned 32-bit integer
ULONGLONG - unsigned 64-bit integer
LARGE_INTEGER - signed 64-bit integer
NTSTATUS - 32-bit error value
HANDLE - Kernel object handle
MDL - Memory Descriptor List
KEVENT - Kernel event synchronization object
KSPIN_LOCK - Kernel spin-lock synchronization object
KSEMAPHORE - Kernel semaphore synchronization object
ETHREAD - Kernel worker thread object
LIST_ENTRY - Double-linked list entry
PDO - Physical Device Object
FDO - Functional Device Object
IRP - Input/output Request Packet
PHY_MEM_TYPE - Memory type enumerator: Reg or PAE

FIG. 4

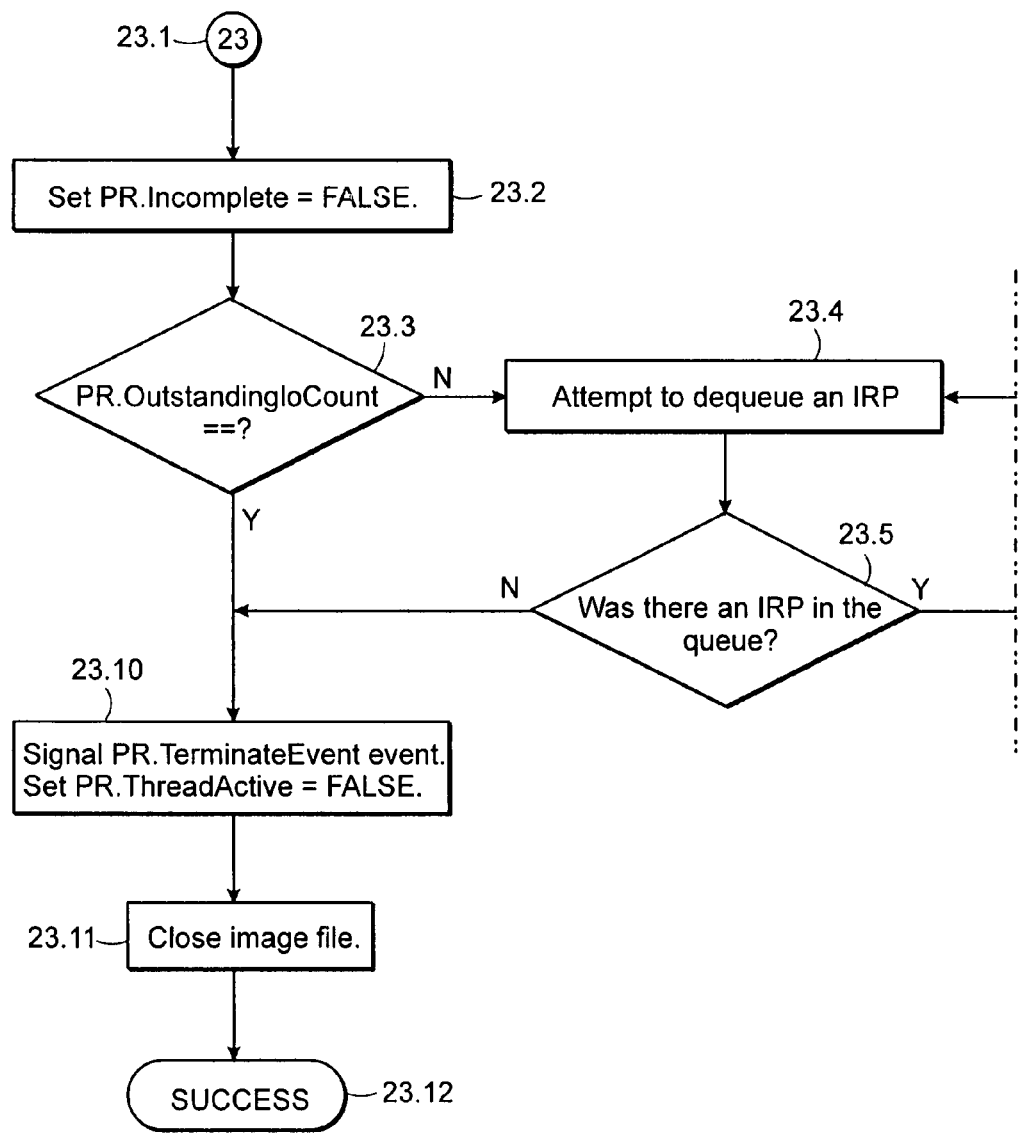

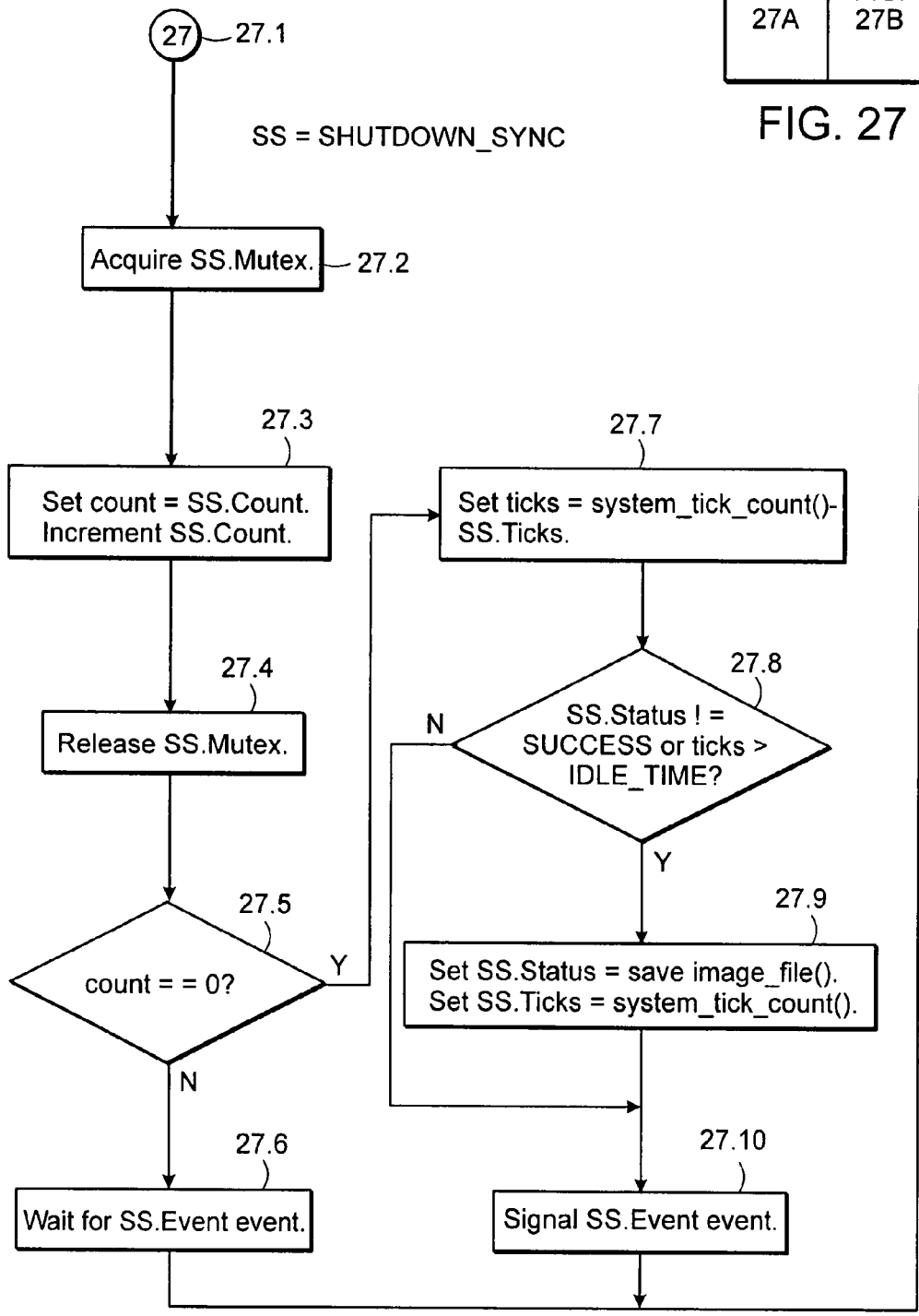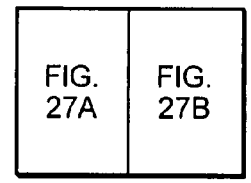
FIG. 27A

SYSTEM AND METHOD FOR PERSISTENT RAM DISK

CROSS-REFERENCE TO RELATED APPLICATION

This patent application is a divisional application of and claims priority to U.S. patent application Ser. No. 10/977,340, filed on Oct. 29, 2004, and entitled "System And Method For Persistent RAM Disk," the entire contents of which are incorporated herein by reference, which claims priority under 35 U.S.C. §119(e) to U.S. Provisional patent application Ser. No. 60/516,043, filed Oct. 31, 2003, which is hereby incorporated by reference.

TECHNICAL FIELD

The present disclosure relates to computer memory, and more specifically, to systems and methods utilizing random access memory.

BACKGROUND

Computer memory generally falls into two categories, called random access memory (RAM) and mass storage (disk). RAM is available in different forms, usually in a semiconductor integrated circuit (IC) package, and is sometimes referred to as a computer's "main memory." Access to memory locations in a RAM device takes place electronically, relying on connections built into the device at the time of manufacture, as well as a corresponding addressing scheme. Disk storage is also available in many forms, a common form being magnetic storage media, such as in a computer "hard disk," which uses an electromechanical read/write head that moves over a surface of the hard disk to access various portions of the hard disk.

In a RAM device, the order of access to different portions of the storage device does not affect the speed of the access. In other types of memory, e.g. magnetic storage, the speed at which information can be accessed depends on its location in the storage device because physical (mechanical) movement of the read/write head is required to access various parts of the storage device. Disk performance suffers when not accessing the portions of the device sequentially, because this requires more movement of the read/write head. Consequently, reading and writing to RAM is usually much faster than the equivalent operations on a disk.

Most computers use a combination of RAM and disk storage. RAM generally provides temporary storage for instructions and data needed during operation, while the normally larger and less expensive disk is used to store programs and data that are not in use. The computer's processors, e.g. the central processing unit (CPU), and the operating system, manage and access information in RAM. In normal operation, the information needed by the operating system and overlying software, e.g. application programs, is pulled up from storage in a disk and placed into addressable memory locations in RAM. Information may be returned to a disk when it is no longer needed to make room in RAM for other information.

One aspect of computer memory and memory device operation considers the potential for data loss or corruption in the event that more than one user or computer program or process ("thread") requests access to the same data or memory block at the same time. A thread requiring data in a memory block sends a request through the operating system to the driver or device manager responsible for providing threads with access to memory. Requests to read, write, or otherwise use a portion of memory are generally referred to as requests to "touch" the portion of memory.

To protect data from loss and corruption, when a memory block is in use, that portion is "locked" using a locking mechanism that prevents threads from accessing the memory block when it is in use by another thread. When the thread having access to the block is finished using the block, it is unlocked, and a thread waiting to use it can access the portion of memory, in turn locking the block while in use. By using the locking scheme, each portion of memory is either unlocked and available, or locked and unavailable, avoiding the possibility of two programs altering the same data and creating a conflict as to the proper content of the portion of memory containing the data. This constant locking and unlocking and use of locks on all memory blocks or pages is costly in computing resources, but has been viewed as important, given the adverse consequences of not protecting data against this potential conflict.

Another aspect of computer memory devices is the notion of volatility. As explained briefly above, RAM is an electronic semiconductor device. Unless power is maintained to the RAM device to refresh and hold its semiconductor logic devices in a same state, the state of the semiconductor logic will be uncertain upon restart, therefore losing the information stored in RAM at the time of shutdown. As such, RAM is most commonly "volatile," as the information in RAM is subject to loss upon powering down the device. Disks usually store information in permanent, persistent, non-volatile form, such as by encoding magnetic regions of a disk or tape in a way that can tolerate loss of electrical power without losing the data stored in a disk.

To enhance the performance (speed) of computers, systems using RAM have been designed to emulate a disk partition in the computer's RAM. This is generally referred to as a "RAM disk," implying that the RAM is effectively being used as a disk storage device. RAM disks provide file access in a way analogous to file access on a disk. Software is used to create and manage the RAM disk so that the operating system of the computer treats that portion of RAM as it would treat an actual disk drive connected to the computer. Since RAM access is much faster than disk access, RAM disks are especially useful to improve the speed of applications that perform frequent memory access operations.

SUMMARY

RAM disks and methods are described for use in computer systems, including stand-alone computers and networked or clustered computer systems. Computer-readable media including software instructions for setting up and operating the RAM disks are also included in this disclosure. The instructions may be executed on one or more processors in a computing environment having an operating system such as the Windows 2000, Windows XP, or Windows Server 2003 operating systems from Microsoft Corporation of Redmond, Wash.

In one aspect, a RAM disk can be restored to contain certain data even following a power down and power up cycle of a volatile RAM device. This is referred to herein as a "persistent" RAM disk to indicate that the otherwise lost data is restored on restart of the computer, and therefore appears to the user to be persistent. One or more embodiments of the RAM disk include an "image" file on a non-volatile storage device (e.g., a disk) other than the RAM disk device. The image file is populated with data contained in the RAM disk prior to shutting down the RAM disk. Then upon restart, a similar RAM disk is created in main memory and the data from the image file is recopied to the new RAM disk. The RAM disk can be created while the operating system is initializing ("booting").

The RAM disk will appear to users and computer applications to be the same before and after the shutdown and restart cycle. Therefore, users do not need to create a RAM disk and re-establish it after restart ("reboot") to contain all the information they were working on before shutdown. This may be performed during the time between the end of the operating system's initialization and the beginning of its shutdown.

Other embodiments include a method for backing up data in the RAM disk during operation by "writing-through" data from the RAM disk to the non-volatile disk device when the RAM disk is in use.

Some embodiments include a method for allowing access to the data associated with the RAM disk before the RAM disk is fully restored on reboot, e.g., in the time between initialization of the system and full restoration of a RAM disk from the image file. Here, the operating system and programs are allowed asynchronous access to information belonging in the RAM disk, whether it is already loaded into the RAM disk, or whether it still physically resides in a disk image file pending loading into the RAM disk.

By moving data to and from the RAM disk in relatively large block sizes, e.g., on the order of megabytes (MB), such as 4 MB, the speed of establishing an image file and/or a RAM disk is increased to reduce latency and wait time. This feature is especially useful in larger RAM disks, e.g., in an enterprise system having a RAM disk size on the order of 1 GB.

Accordingly, one or more embodiments described herein are directed to a method for backing up a RAM disk to a specified backup disk volume, the disk being a persistent storage device other than main memory. This method includes intercepting an I/O request packet (IRP) from the operating system that indicates that the operating system is ready to shut down; blocking or delaying the shutdown of the operating system to allow backup of the RAM disk to the image file on the backup storage device; making an image copy of the RAM disk to the image file on the backup storage disk; and signaling the operating system that it is permitted to shut down the operating system when the image file backup is complete. The backup storage disk is a magnetic storage disk in some embodiments.

A method for restoring a RAM disk in main memory from a RAM disk image file on a backup storage disk is also described. Some embodiments include locating the image file on the backup storage disk following system boot-up; creating a RAM disk in main memory (RAM); allowing asynchronous and substantially simultaneous access to the image file on the backup disk and on the RAM disk, so that the combination of the two are available for simultaneous access during both system boot-up or subsequent shutdown before the RAM disk is fully populated from the image file.

Other methods described here are directed to restoring from the RAM disk an image file on the backup disk to the RAM disk in main memory, including enabling access to the combined image file and RAM disk so that even though the RAM disk is not fully populated with the image file data, users or other operating system accesses to the combination of the two do not have to wait for the RAM disk to be fully populated in order to access the data stored originally in the image file.

In the previous method, the process can include allowing operating system to shutdown, even though the previous restoration of the RAM disk from the image file was not yet completed. The RAM disk image is saved in a consistent state to the image file on a backup disk before the system shutdown is allowed to complete.

Other inventive methods and systems for carrying out the same provide for allocating the RAM disk storage early in the boot cycle and/or creating an image file that corresponds to the RAM disk. This allocation can be made by creating an image file having the exact same size as the RAM disk on a user chosen partition. The image file may initially contain no data (or no organized information other than default or random data).

Yet other embodiments include a system and method for protecting data from being corrupted or lost by multiple program threads requesting the same data or requesting access to data in the same storage location at the same time. In one or more examples, rather than use the traditional locking mechanisms described above, an in-use table or list is created and managed by a "gate" software program to track the threads using or waiting to use a portion of memory. Various entries are kept in the list, and threads can determine when a portion of memory can be touched and when they cannot be touched based on whether they are in use by other threads.

Additionally, the threads and gate program determine a sequence of dependency, whereby threads waiting on for another to use the same memory blocks administer the succession of rights to the memory blocks in an organized fashion. By using relatively small-sized memory blocks, e.g. a 512-byte sector, the number of conflicts and the number of threads kept waiting for access to the same memory blocks is reduced. Only memory blocks needing protection from simultaneous touching are affected. Accordingly, performance improvements may be realized because the present method would not require the costly conventional locking and unlocking operations.

Other features and advantages of the aspects of the present invention will become apparent from the following detailed description and drawings.

BRIEF DESCRIPTION OF THE DRAWINGS

FIG. 4 illustrates exemplary basic data types used in a RAM disk;

DETAILED DESCRIPTION

Data is moved, retrieved, and stored in the components of a computer or memory device according to digital communication signals, sometimes packets, exchanged between various computer components. The signals are exchanged over buses that connect the components to one another. The signals are generated and controlled by software, such as operating system software and device driver software executing in one or more processors in the computer.

Application programs running in the operating system environment and on the hardware/software platform of the computer take in data (input) and provide result data (output). Both the input and the output data are stored in memory for use as an intermediate result to facilitate future operations, or as a finished product for archival purposes. Therefore, software programs, e.g. applications, use mechanisms to call for and deposit their input and output data to memory. The way software applications perform this retrieval and archiving of data is through making calls to the operating system. The operating system in turn passes the requests of the applications, or their threads, to a software device that is programmed to provide the called data to or from the operating system. There are many ways to make system calls and requests to memory. The descriptions and embodiments given below illustrate only some exemplary ways of performing these operations. The calls or requests made by the program process threads is reformatted to suit the needs of the underlying memory management and driver software if necessary.

The software application passes requests for services affecting the RAM disk to the operating system, which has an associated file system that passes on the requests in turn to an I/O manager. In some embodiments, the I/O manager passes on the request to RAM disk gate management software that controls access to the RAM disk. These steps can also include reconfiguring a plurality of memory address blocks so that a group of memory blocks that constitute a data object, e.g. a file, can be grouped to form a new entity that is logically associated with the data file at a desired abstraction level. Once the necessary data is retrieved, the process is reversed to provide the application with the data it requested.

Figure 1:
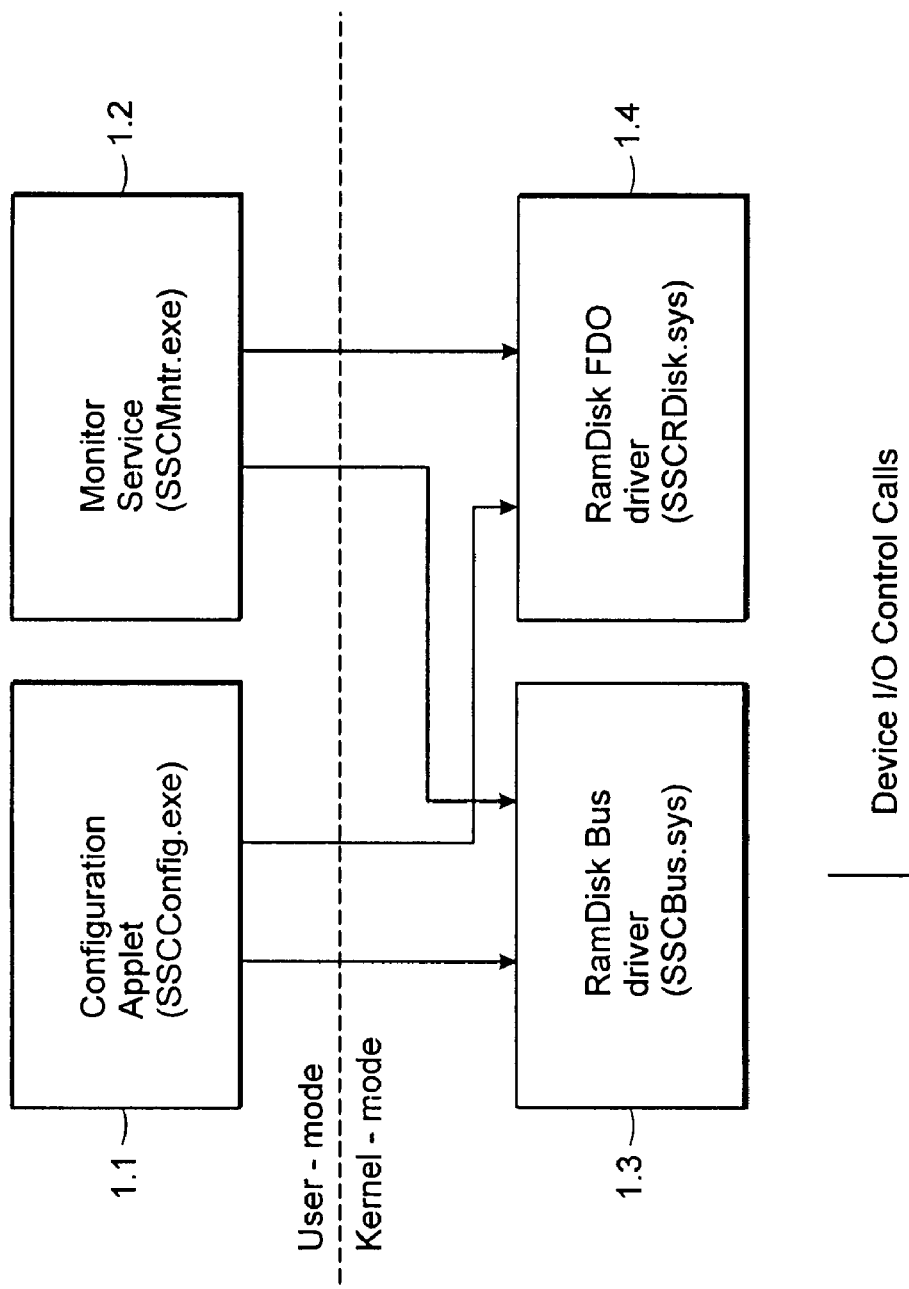
FIG. 1 illustrates a RAM disk kernel-mode and user-mode components.

Referring to FIG. 1, a RAM disk device is managed by four components (preferably implemented in software): a configuration applet (1.1), a monitor service (1.2), a bus device driver (1.3), and a functional device driver (1.4). The applet and service, both user-mode components, directly control the devices managed by the functional device driver (FDO driver) and bus device driver (bus driver), via custom device input/output control (DIOC) calls. The operating system provides the service infrastructure to support DIOC calls between software entities.

Figure 2:
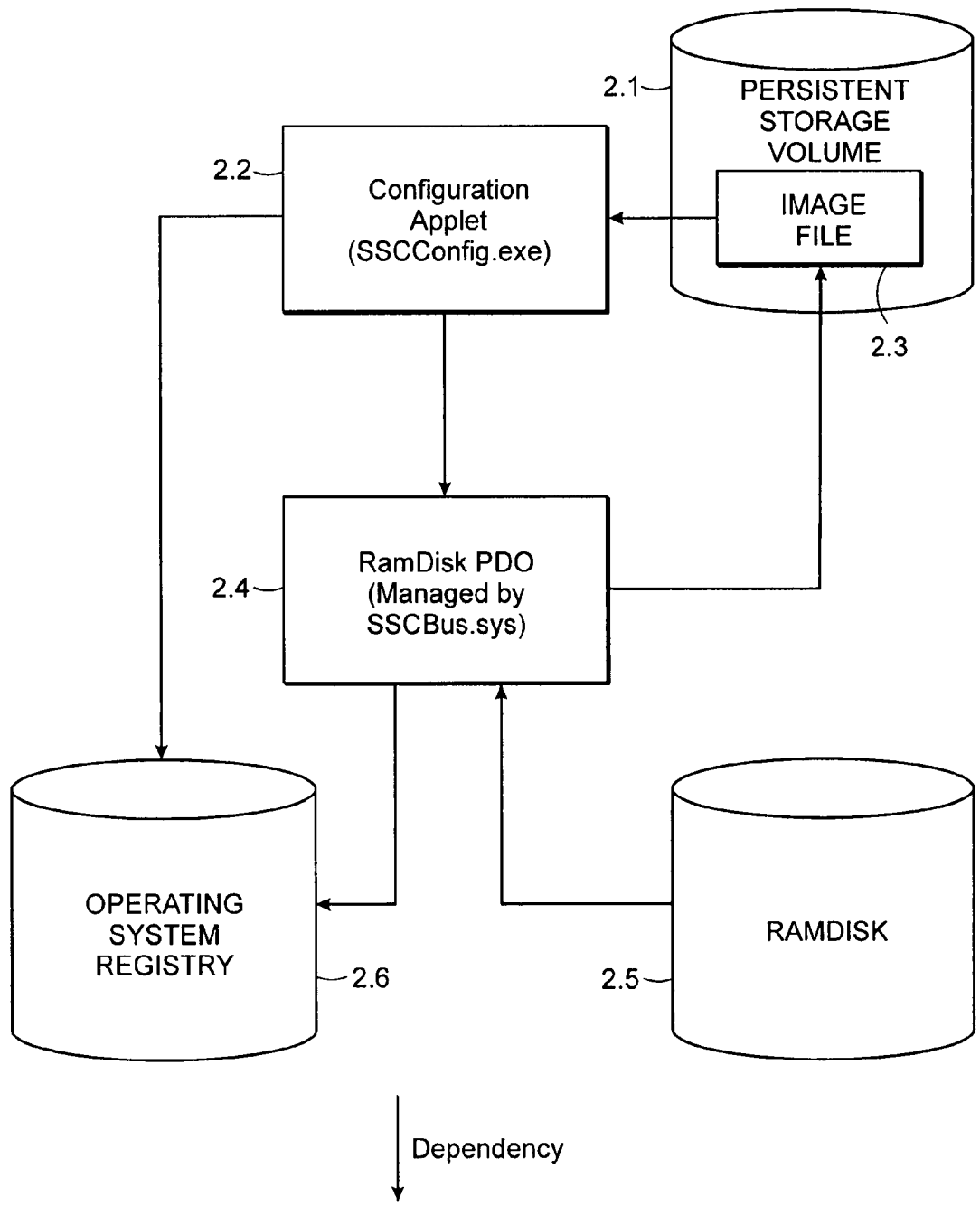
FIG. 2 illustrates an overview of a system using a RAM disk.

Referring to FIG. 2, a RAM disk (2.5) is added and deleted using the configuration applet (2.2). To add a RAM disk, the user selects the size of the RAM disk, its proposed drive letter, the drive letter of the volume (2.1) where its image file (2.3) will be stored, and its file system. The first three parameters are sent via DIOC call to the bus driver, which creates the new RAM disk's physical device object (PDO) (2.4).

The applet indirectly controls the bus device by adding these same values (or parameters) to, or deleting the values from, the operating system registry (2.6). The registry is a persistent database managed by the operating system. This indirect control occurs during operating system initialization, when the bus driver examines the registry and attempts to retrieve the special values. Depending on the presence or absence of those values and their validity, the bus driver can create a RAM disk PDO and load its image.

Figure 3:
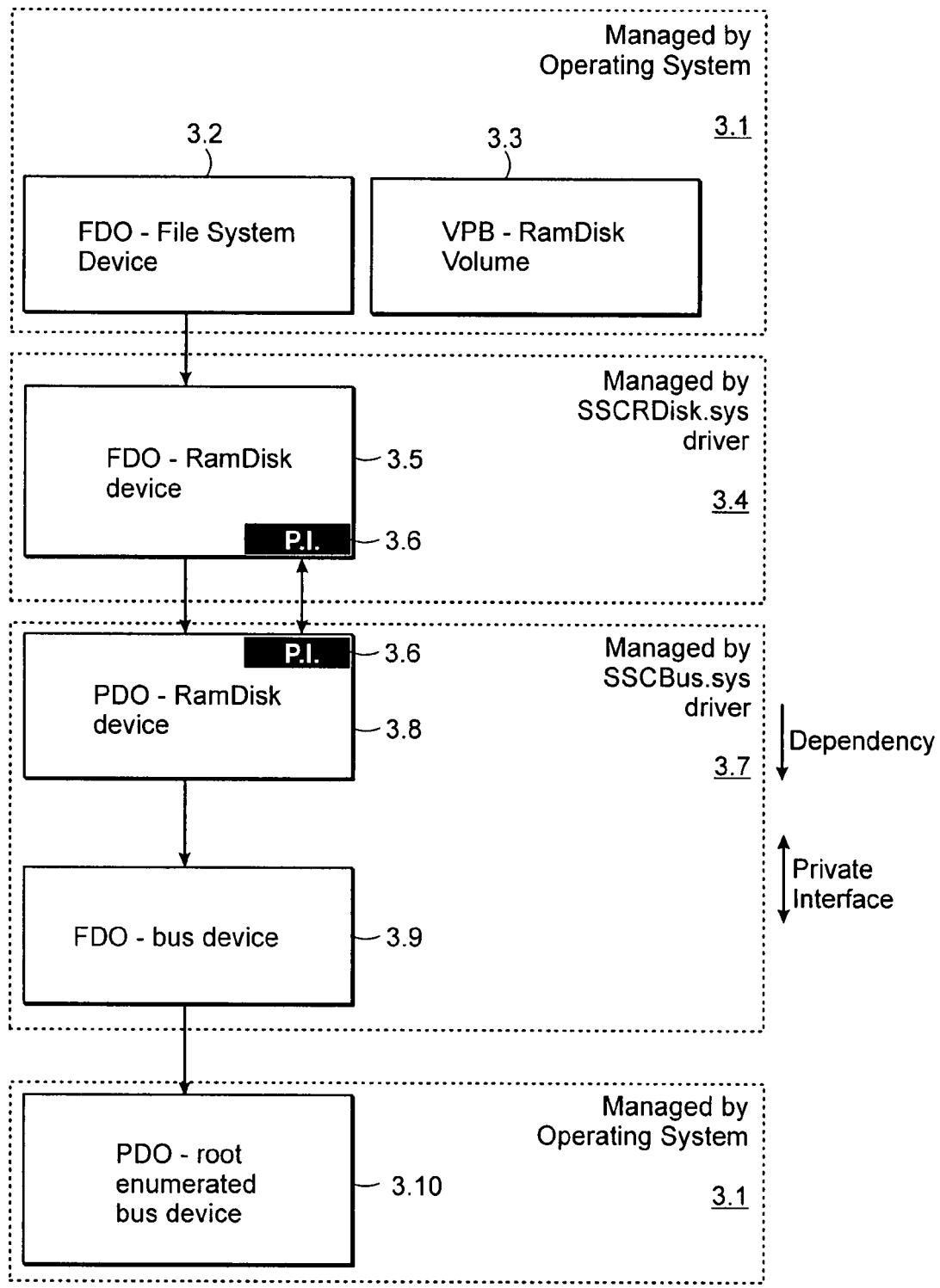
FIG. 3 illustrates a RAM disk device stack.

Referring also to FIG. 3, a RAM disk device stack includes a bus device installed as a root-enumerated device (3.10), whereby it is automatically created by the operating system (3.1) during system initialization. This device is a physical device object (PDO). A bus driver, SSCBus.sys (3.7), is loaded by the operating system to drive the PDO. It creates a corresponding functional device object (FDO) (3.9) for the PDO. If valid registry values are present describing a persistent RAM disk in the sense described here, the bus driver creates the RAM disk's memory image and a PDO (3.8) to represent the software device. The contents of the image may be empty. The operating system loads and starts an FDO driver, SSCRDisk.sys (3.4), to drive the new RAM disk PDO (3.8). This driver creates a FDO (3.5) which corresponds with the PDO (3.8) created by the bus driver. These two devices are coupled via a private interface (3.6), which permits each driver special access to the other's device. The operating system (3.1) queries the RAM disk FDO (3.5) for a suggested drive letter, and the FDO driver (3.4) responds with the proposed drive letter parameter contained in the PDO device (3.8). The operating system (3.1) may load other drivers, such as a file system driver, to drive a file system device (3.7) it creates as the result of finding a valid file system stored in the RAM disk's image. The operating system may associate other objects, such as a Volume Parameter Block (VPB) (3.3), with the RAM disk.

As noted earlier, when a user adds a RAM disk (2.5) using the configuration applet (2.2), the RAM disk image created by the bus driver (3.7) is empty. Following its creation, the applet uses an operating system utility to format the RAM disk image. Then the operating system detects the new file system present on the RAM disk, and loads the corresponding file system driver to manage it.

The RAM disk is now available for use as a storage device to any application, service, or device that may be running or present on the system. In typical systems, the contents of RAM are lost on shutdown, but the RAM here appears to be persistent. When the operating system begins its shutdown, the bus driver (3.7) saves substantially the entire contents of the RAM disk (2.5) to the image file (2.3) on the indicated persistent storage volume (2.1). The entirety of the RAM disk's contents can be saved to the image file, but it is not always necessary to save the entirety of the RAM disk's contents to the image file as is; modifications, additions, or deletions can be made to this content.

When creating a RAM disk device as described above, the applet (2.2) stores the same three parameters passed to the bus driver (2.4) in the registry (2.6). During operating system initialization, if the bus driver finds these values, and if it determines that they are valid, it creates a RAM disk PDO (2.4) with an image (2.5) of the specified size, and loads its image from the image file (2.3) located on the specified persistent storage volume (2.1).

If the image file does not exist, or cannot be opened or read, or is of the wrong size, the RAM disk's contents are emptied. The monitor service, through DIOC calls, can detect the empty RAM disk and use an operating system utility to format it for use with a supported file system. FIG. 4 illustrates the basic data types used by the RAM disk.

Figure 5:
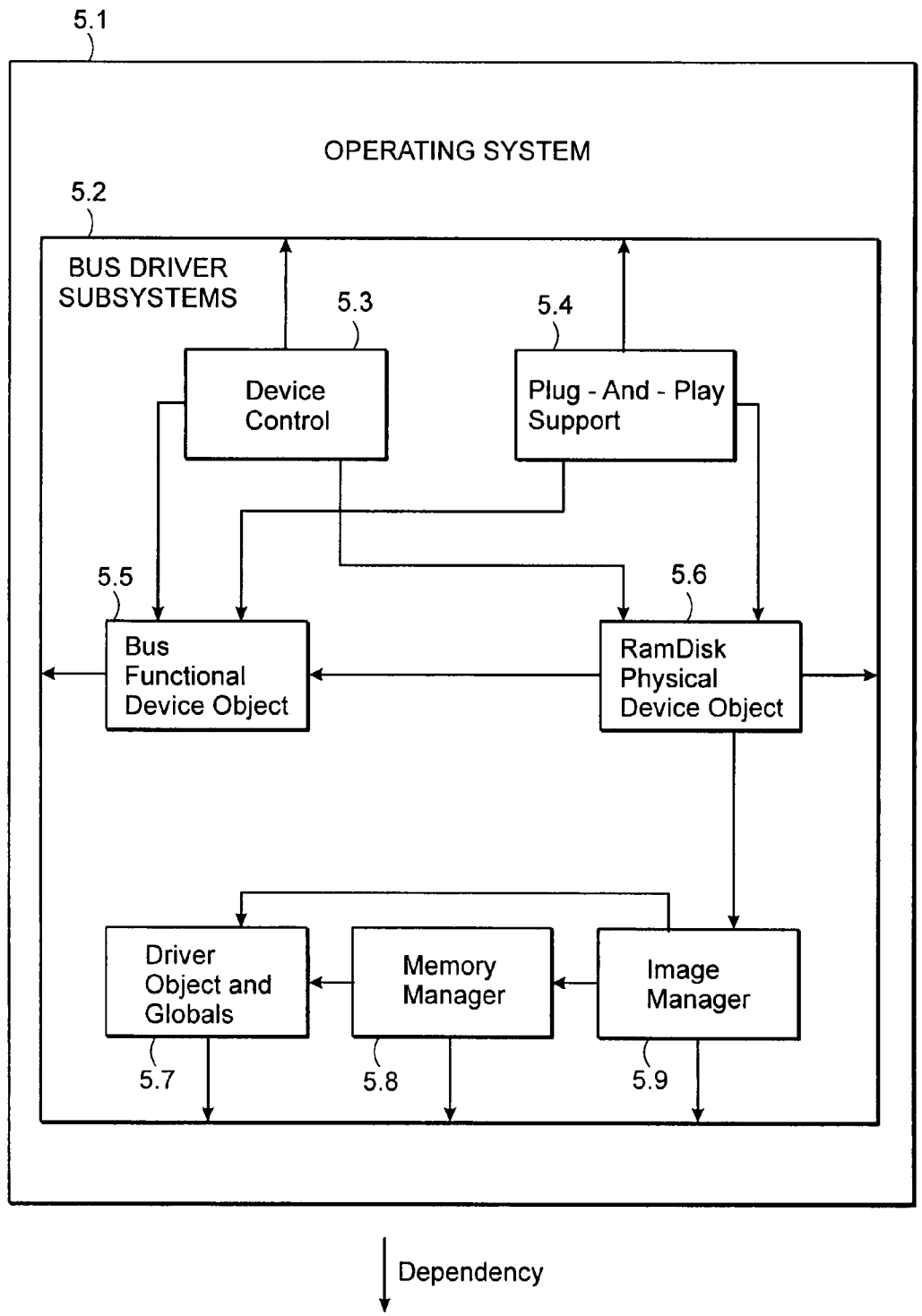
FIG. 5 illustrates a bus driver subsystem.

Referring to FIG. 5, the bus driver is divided into several logical entities. The logical entities depend upon the services of the operating system (5.1). The bus driver subsystems (5.2) have logic for servicing device I/O control (DIOC) calls (5.3). Custom DIOCs are handled by the bus driver. Logic to support the operating system's plug-and-play (PNP) manager (5.4) is provided. Both the DIOC and PNP logic depend upon the bus's FDO and the RAM disk's PDO. Underlying these are driver object and global data services (5.7), a memory manager (5.8), and an image manager (5.9). To improve performance, the memory manager (5.8) provides a set of services to allocate and free large (4 MB or more) blocks of physical memory. The image manager (5.9) provides a set of services to load and save a physical memory image (or "image"), which is a collection of physical memory blocks.

Figure 6:
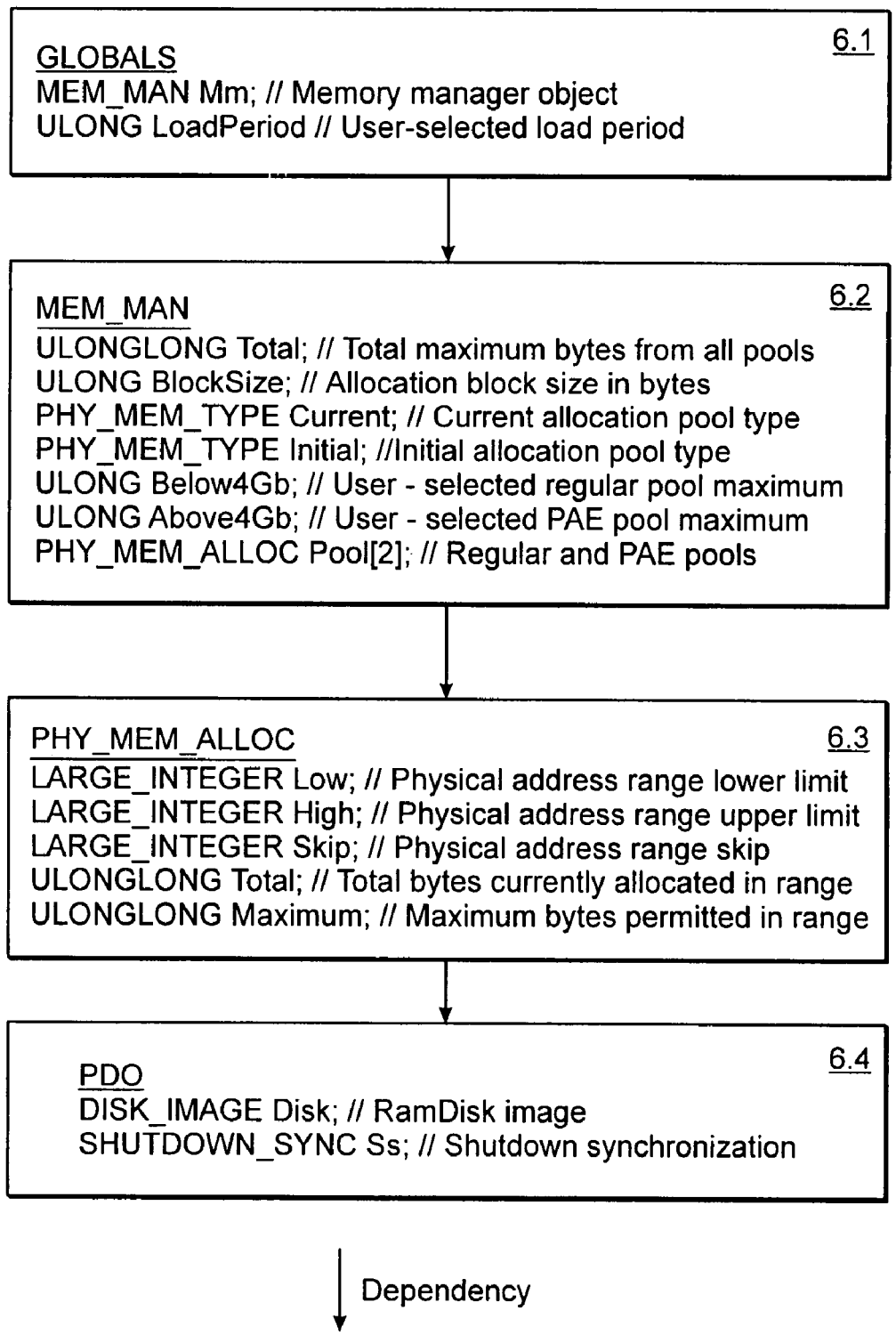
FIGS. 6-8 illustrate bus driver objects
Figure 7:
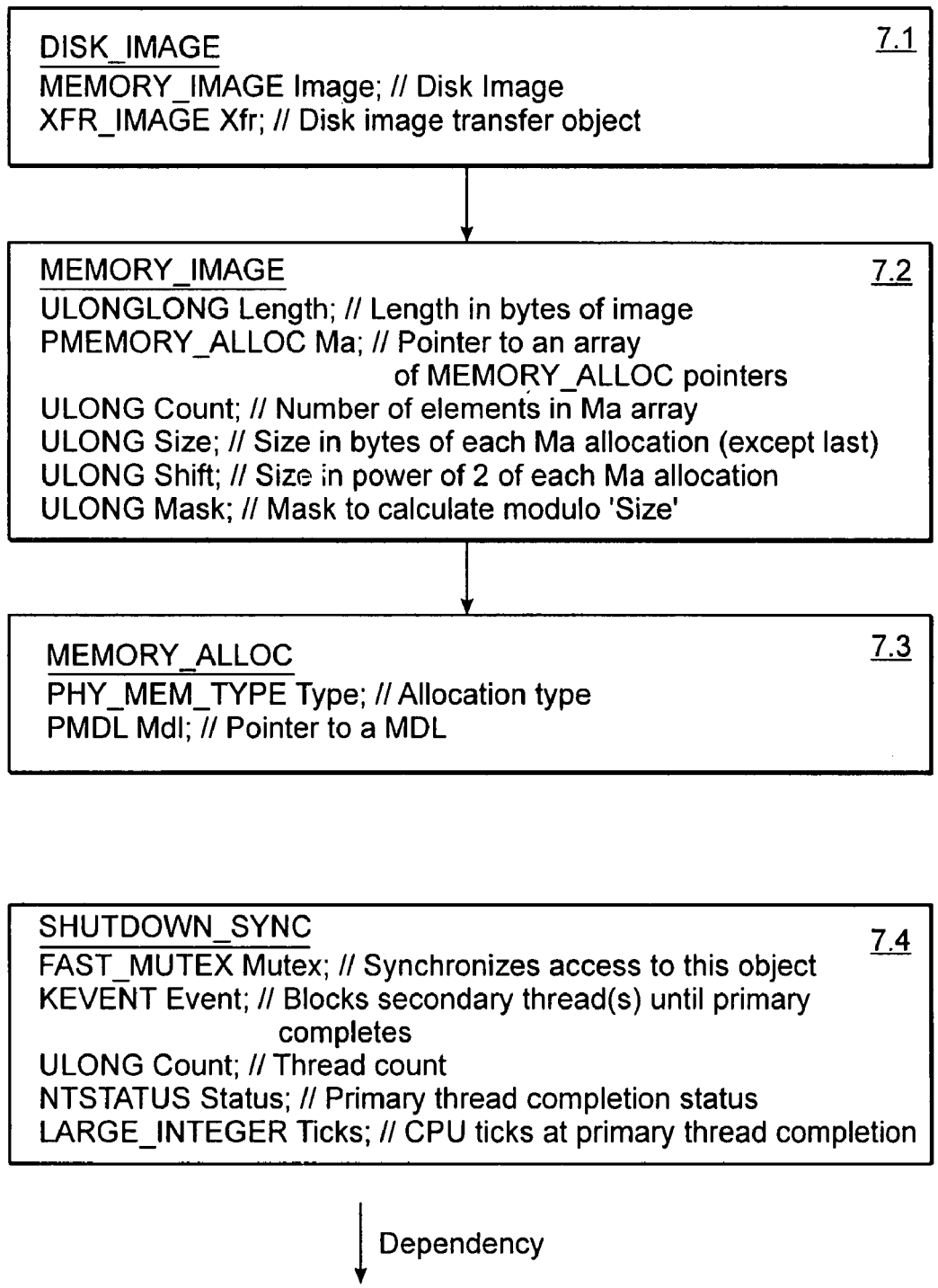
Figure 8:
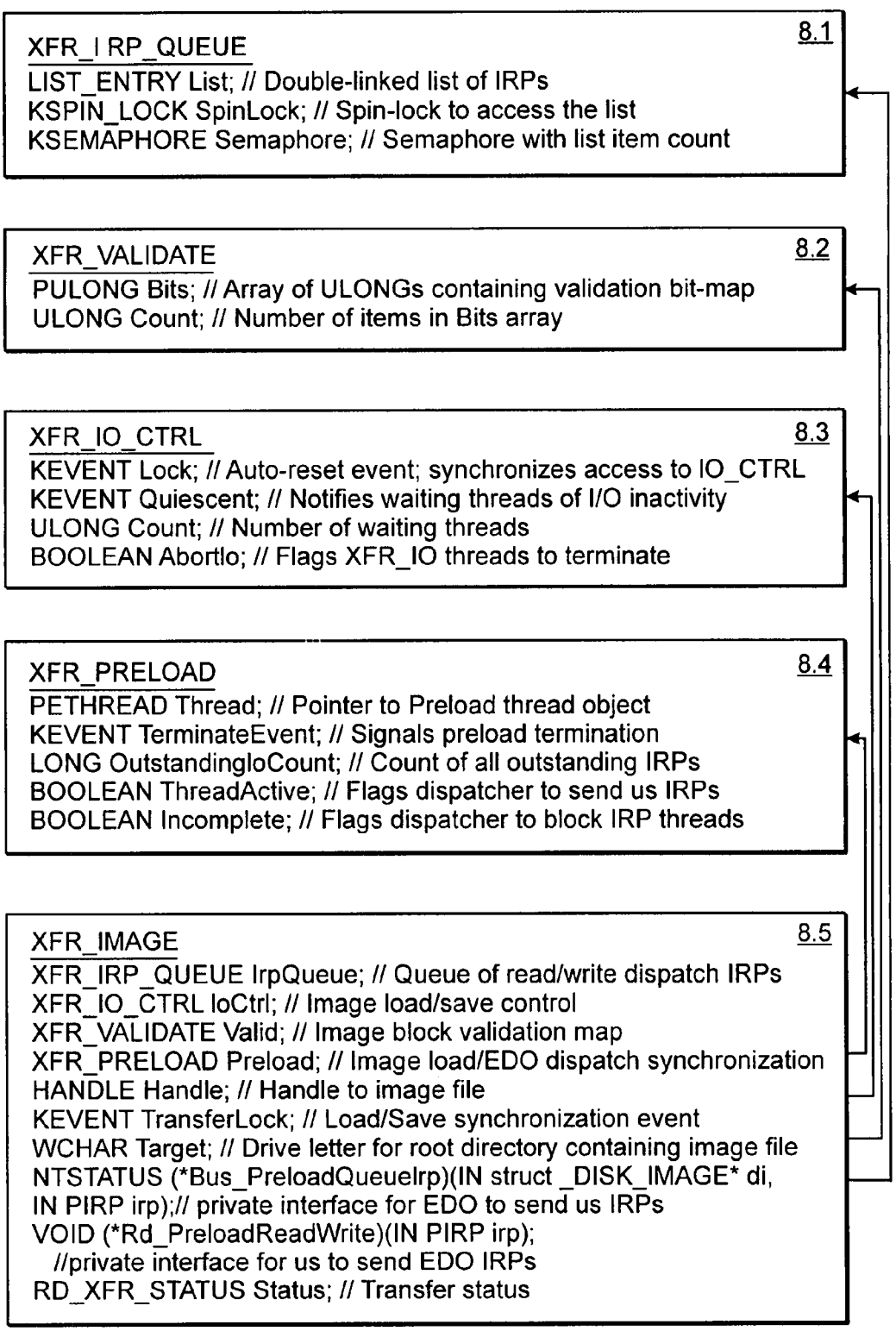

Referring to FIGS. 6-8, to support the bus driver, a number of software objects are used. These software objects include other objects, some of which are of the Basic Data Types described earlier (see FIG. 4). The bus PDO has a single GLOBALS object (6.1), which, in turn, has a single MEM_MAN object and a ULONG LoadPeriod, the value of which is loaded from the registry during driver initialization.

The MEM_MAN object (6.2) is used by the memory manager (5.8) to provide its services. The ULONG Below4Gb and ULONG Above4Gb are also loaded from the registry during driver initialization. The MEM_MAN object has two instances of the PHY_MEM_ALLOC object. The two are placed in an array labeled "Pool." These two instances represent pools of "regular" and "PAE" physical memory. "Regular" physical memory is physical memory addressed with 32-bits or less (below 4 GB). "PAE" physical memory is physical memory addressed with more than 32-bits (above 4 GB).

A PHY_MEM_ALLOC (6.3) object describes the range and size of a physical memory pool. The PDO (6.4) object has a Disk_IMAGE (7.1) object and a SHUTDOWN_SYNC (7.4) object. The Disk_IMAGE (7.1) object has a MEMORY_ IMAGE (7.2) and a XFR_IMAGE (8.1) object.

The MEMORY_IMAGE (7.2) object represents the RAM disk itself. It holds the references to the RAM disk's physical memory. It also has the number and size of the blocks which, as a collection, form the RAM disk's image. Each block is preferably described by a MEMORY_ALLOC (7.3) object. The MEMORY_IMAGE object's MA attribute is a pointer to an array of MEMORY_ALLOC objects. The number of elements in this array depends on the total size (or "Length") of the image and the size ("Size") of a block. Preferably, each MEMORY_ALLOC object represents a block. The last block in the array is of size "Size" or smaller, depending on the image's "Length".

The MEMORY_ALLOC (7.3) object represents a memory block. A block is of type "Reg" ("Regular") or "PAE". (See MEM_MAN, above). The actual physical memory which composes the block is described by an operating system object, a Memory Descriptor List (MDL). MEMORY_ALLOC has a pointer to the corresponding MDL. The SHUTDOWN_SYNC (7.4) object is used to synchronize multiple operating system threads carrying shutdown notification.

Threads access information in memory by providing I/O request packets (IRPs) containing information about which part of the memory (what address ranges) are to be accessed, and what type of operation the thread seeks to perform on the data in the memory. In some embodiments, the address information is mapped from virtual to physical address ranges because the threads process virtual address information, while the gate application processes physical address information.

The XFR_IRP_QUEUE (8.1) object maintains a queue of read and write IRPs from the RAM disk FDO. This queue is maintained while the RAM disk image is being loaded from the image file. Until the entire RAM disk image is loaded (and, therefore "valid"), the FDO may receive read or write requests targeting regions of the RAM disk that are not yet valid. The queue is used to properly service the IRPs during this period.

The XFR_VALIDATE (8.2) object represents the state of the RAM disk image during validation (image loading). The image is loaded in discreet, fixed transfer blocks (not to be confused with physical memory allocation blocks) of size XFR_SIZE=4 MB. Each time a transfer block is successfully loaded, its corresponding bit in the bit array pointed to by PULONG Bits is set. ULONG Count describes the total number of ULONG elements in PULONG Bits.

The XFR_IO_CTRL (8.3) object synchronizes access to and management of the image file handle (XFR_IMAGE Handle, 8.5) and XFR_VALID.Bits (8.2) resources. The BOOLEAN AbortIo flag is used to notify possessors of the resources to release them and terminate operation. The XFR_PRELOAD (8.4) object describes the load (validation) thread and synchronization mechanisms between it and the FDO's read/write dispatch threads.

The XFR_IMAGE (8.5) object has an instance of each of the previous four objects. Additionally, it has the image file's HANDLE handle, a lock, KEVENT TransferLock, to synchronize access to the image file between a save thread and a load thread, the image file's volume's drive letter WCHAR Target, and the transfer status RD_XFR_STATUS Status. Additionally, it has pointers to two functions: NTSTATUS (*Bus_PreloadQueueIrp), used by the FDO driver to have the bus driver queue incoming read/write IRPs while the bus driver is validating the image, and VOID (*Rd_PreloadReadWrite), used by the Bus driver to have the FDO driver service a read/write IRP.

The systems described here can provide savings by controlling access to memory blocks on a thread-by-thread basis and preventing multiple thread access to the blocks, rather than by locking each page of the memory and assuming that the pages must be unlocked as is often done. Traditional locking systems call for locks to be stored in non-paged memory. By not providing locks to each page or block of memory, it is possible to achieve a reduction in time and storage required to administer locks for each page of memory.

Figure 9:
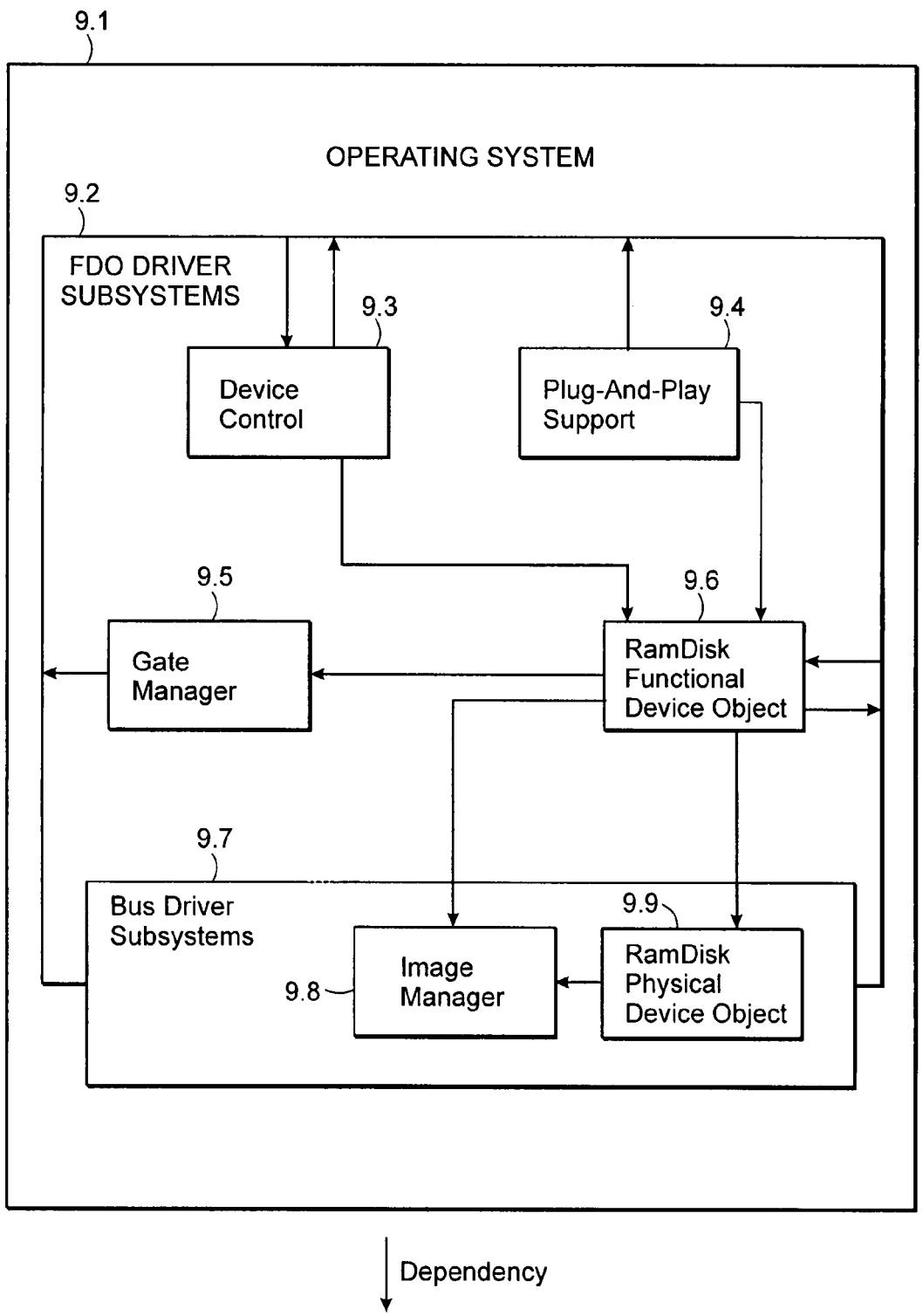
FIG. 9 illustrates a FDO driver subsystem.
Figure 10:
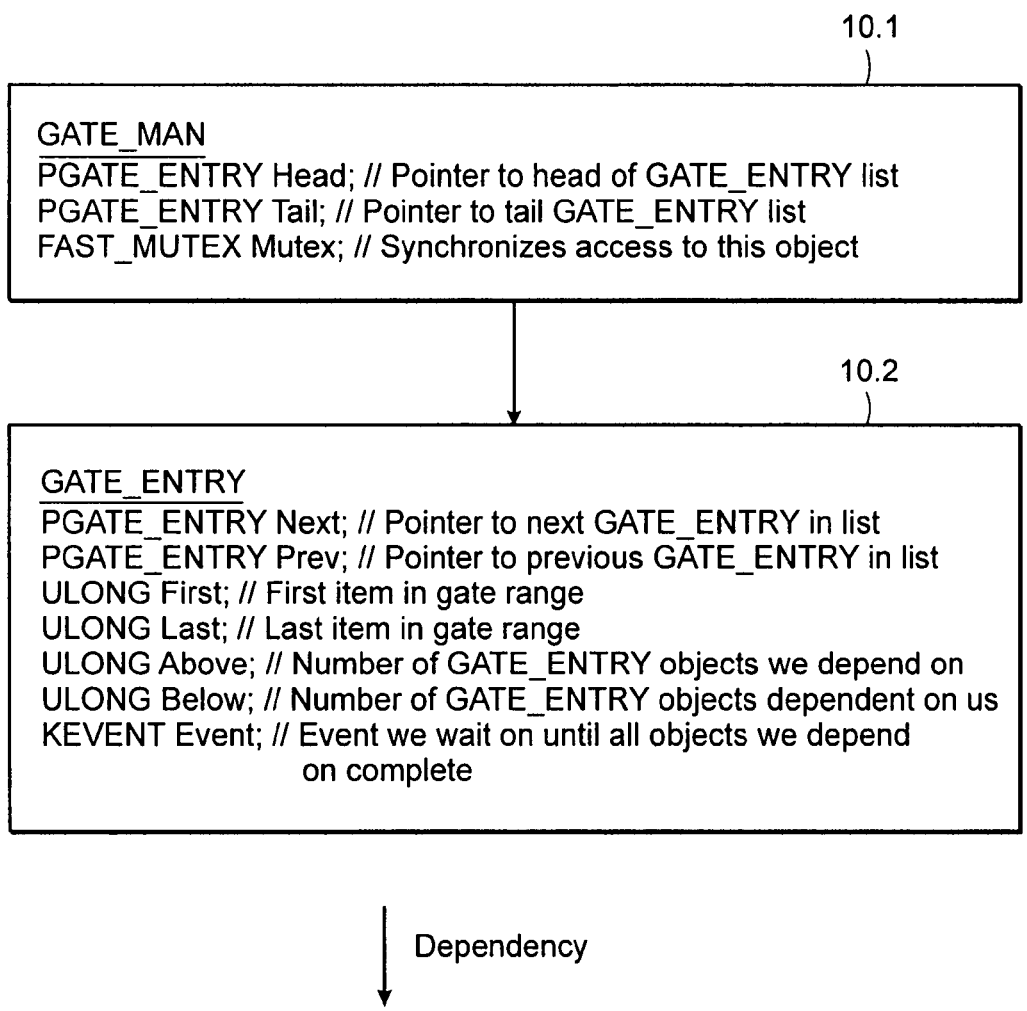
FIG. 10 illustrates FDO driver objects.

Referring to FIG. 9, the FDO driver is divided into several logical entities that depend upon operating system (9.1) services. The FDO driver (9.2) has logic for servicing Device I/O Control (DIOC) calls (9.3). Custom calls and operating system-defined DIOC calls are handled by the FDO driver. Logic to support the operating system's PNP Manager is provided (9.4). Both the DIOC and PNP logic depend upon the RAM disk's FDO (9.6). Underlying these are the Gate Manager (9.5), the Memory Manager (5.8), and the Bus' PDO (9.7). The GATE_MAN (10.1) object has a double-linked list of GATE_ENTRY items (see 10.2), access to which is controlled by its FAST_MUTEX Mutex (mutual exclusion object), a program object that allows multiple threads to share the same resource.

The list is double-linked and includes a head entry and a tail entry. Mutex is acquired by a thread entering the list, along with the indication of the range of memory blocks to be touched. Mutex gives the thread the right and priority to take control of the memory block or range of blocks.

The number of threads involved in accessing the computer's processor and memory can be arbitrary for the purposes of the present discussion. That is, the list can include tens or even hundreds of active threads, depending on operating conditions and resources and designs.

The GATE_ENTRY (10.2) object has list linkage (PGATE_ENTRY Next and PGATE_ENTRY Prev), the gating range (ULONG First to ULONG Last), the number of depending and dependent entries (ULONG Above and ULONG Below), and the KEVENT Event used for synchronizing the gates.

In one embodiment, counters are kept in a list to track the dependencies of threads entering and exiting the list and making requests for data in the RAM disk. A given thread may depend on one or more threads that are ahead of it in a list of threads waiting for a specific memory block. In addition, the thread may then be ahead of other newly-entering threads that will depend on it for access to the memory block. To track the dependencies, counters indicative of the number of threads on which the thread depends and counters indicative of the number of threads depending from the thread are maintained.

For example, threads inferior (dependents) to a thread having possession of the memory blocks increment the counters to indicate to the superior (possessing) thread that they are waiting for the memory block. When the superior thread is finished with the memory block it decrements the counters for the inferior waiting threads upon exiting the list to indicate to the inferior threads that they are now waiting for one less thread to use the memory block. When an inferior thread's wait counter reaches zero, that means the thread is now ready to touch the memory block for which it had been waiting.

Figure 11A:
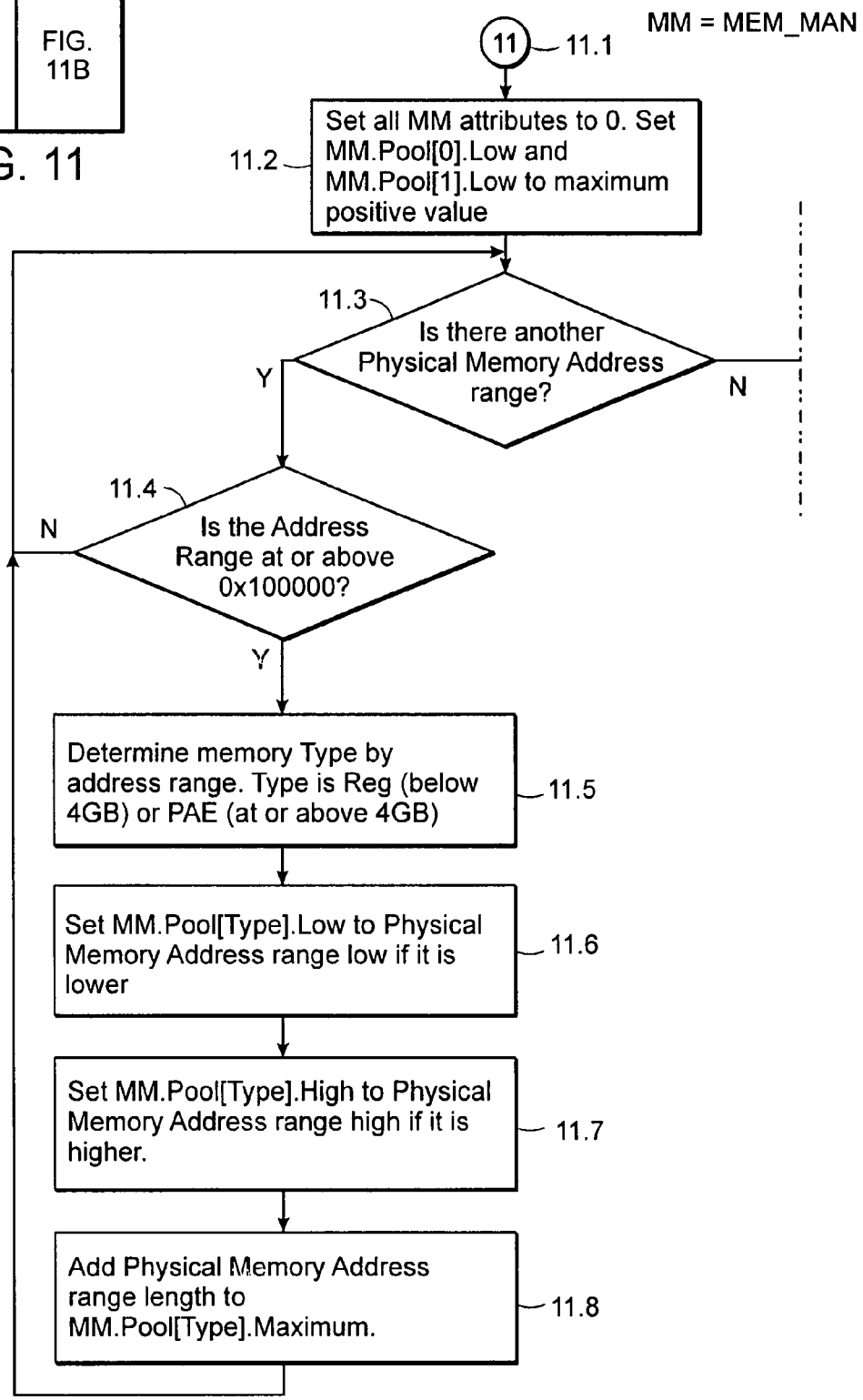
FIG. 11 illustrates initializing a bus memory manager.
Figure 11B:
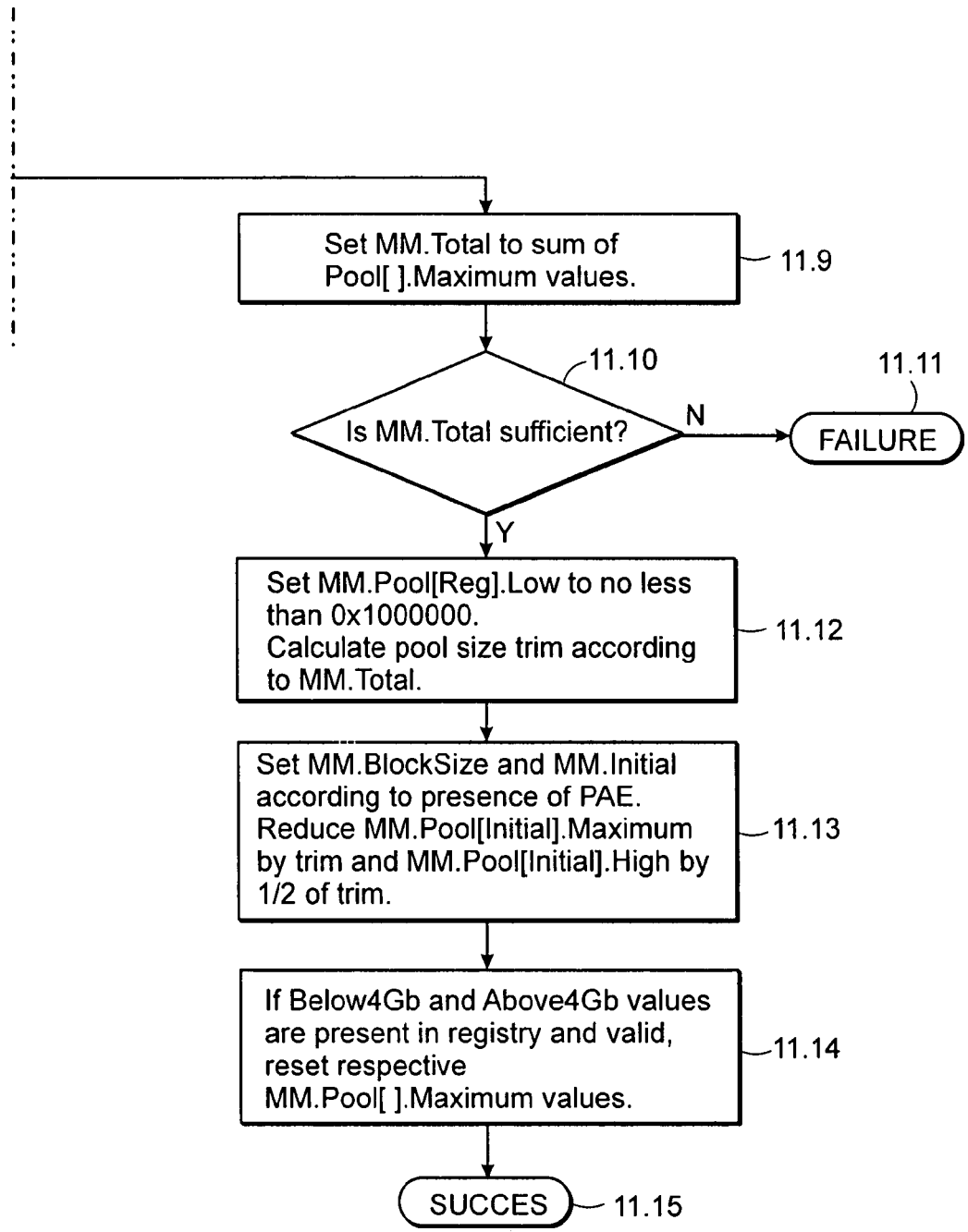

When the operating system loads the bus driver, it calls an initialization routine (DriverEntry( )). When the bus driver is loaded, a single instance of the GLOBALS (6.1) object is created. The object representing the memory manager is stored in the MEM_MAN object GLOBALS.MM (6.1). MM represents the single GLOBALS.MM instance. Within the driver's initialization routine, a call is made to initialize the memory manager (see FIG. 11). Preferably, no arguments are passed to the routine (11.1). First, all attributes are zeroed, except Below4Gb and Above4Gb, which are read from the registry, and the Low values of Pool(0) and Pool(1), which are set to their maximum positive value (for a 32-bit platform, the value is 7FFFFFFFh) (11.2). Then, the routine queries the operating system iteratively to examine the physical memory address ranges detected and managed by the operating system (11.3). Addresses above 100000h (1 M) are processed (11.4).

To process a range, its type is detected (11.5) as "Reg", below 4 GB, or "PAE", above 4 GB. The low (11.6) and high (11.7) limits of the corresponding MM.Pool( ) are adjusted as necessary. The length of the range is added to the corresponding MM.Pool( ).Maximum value.

When the ranges have been examined, the MM.Total value is set to the sum of the MM.Pool( ).Maximum values (11.9). This value represents the gross amount of physical memory available to the bus driver. If the minimum amount of physical memory is not available (11.10), the routine fails (11.11).

Otherwise, MM.Pool(Reg).Low is adjusted to no less than 1000000h (16 MB) and a pool size trim amount is calculated according to the raw gross amount of physical memory (11.12). The pool size trim is an approximate minimum amount of physical memory prescribed by the operating system. MM.BlockSize and MM.Initial are set according to the presence or absence of PAE memory. If PAE memory is present, MM.BlockSize is set larger to reduce the number of blocks required per allocation, and MM.Initial is set to type PAE, instead of type Reg. Also, MM.Pool(MM.Initial) is reduced by the pool size trim (11.13). If PAE memory is present the trim affects the PAE pool; if not, it affects the Reg pool.

Figure 12:
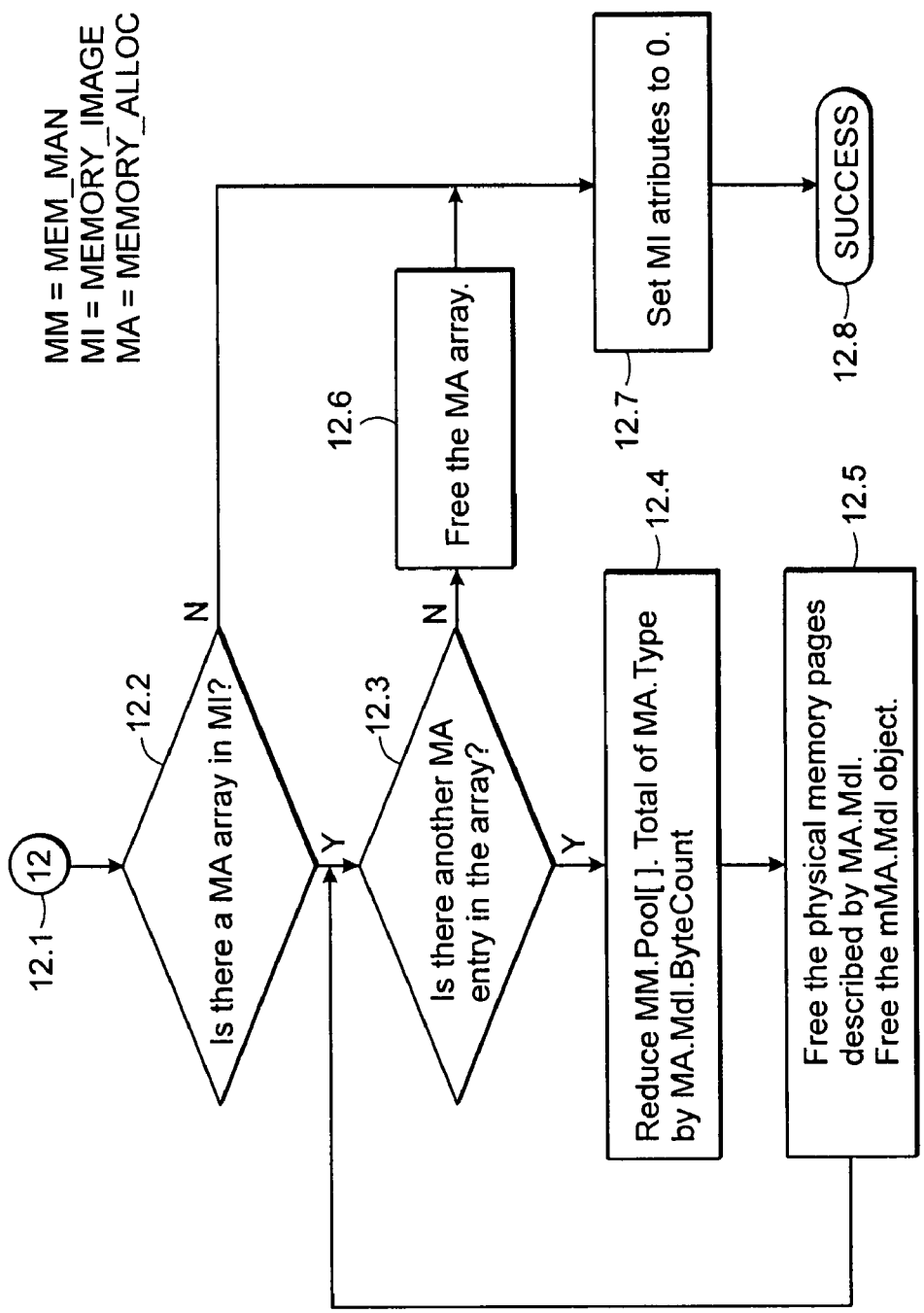
FIG. 12 illustrates image deallocation in a bus memory manager.
Figure 13:
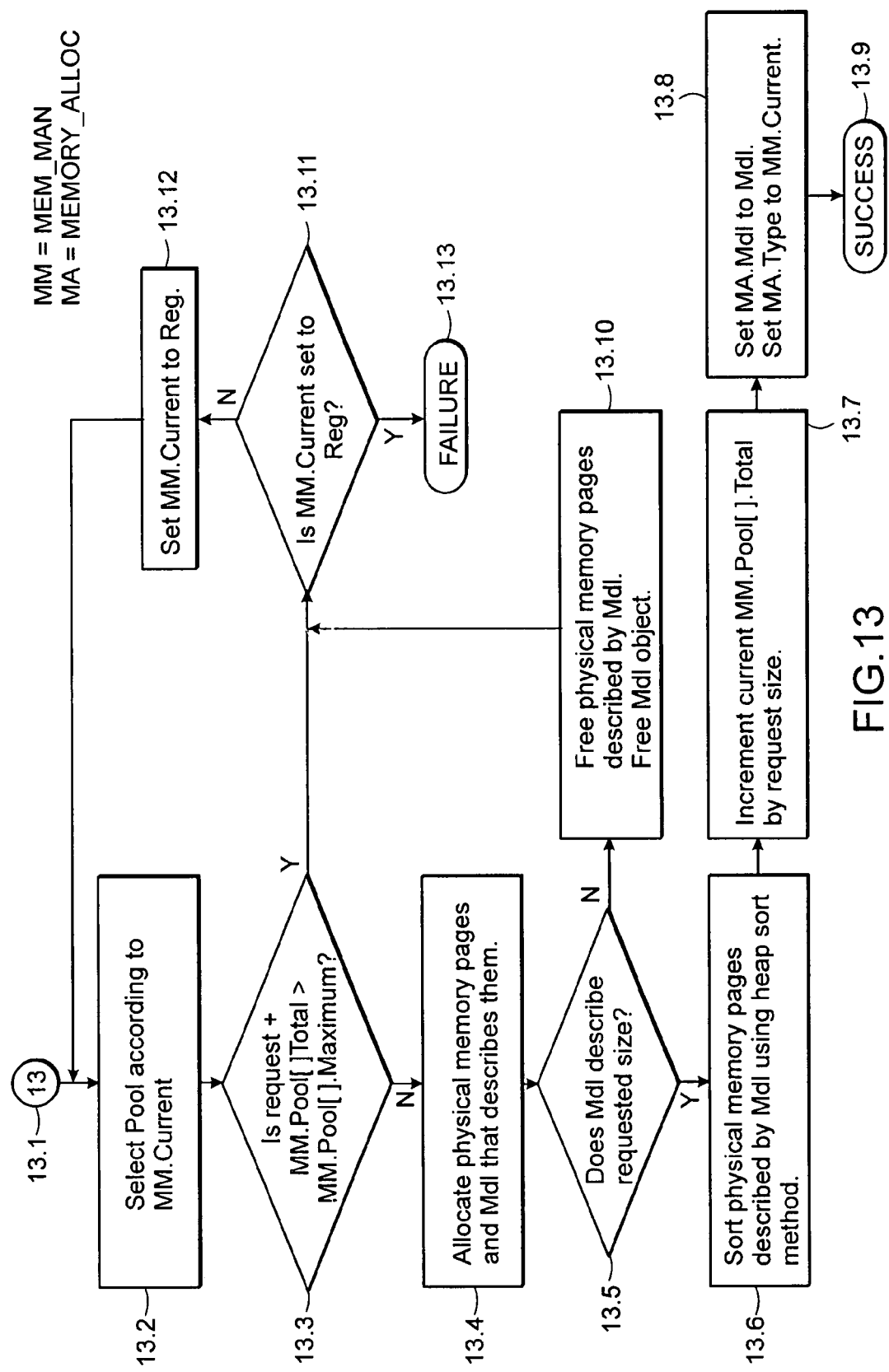
FIG. 13 illustrates block allocation in a bus memory manager.

Finally, the MM.Below4Gb and MM.Above4Gb values are examined. Preferably, each valid value is used to reduce the MM.Pool( ).Maximum to said value (11.14). For example, if Above4Gb is set to 80000000h (2 GB), and there are 100000000h (4 GB) of PAE available (i.e. MM.Pool (PAE).Maximum==100000000h), then MM.Pool(PAE). Maximum is set to 80000000h. These values allow the user to control the amount of Reg and PAE memory allocated by the driver. The routine then returns successful (11.15). The driver-defined memory image is defined as a collection of driver-defined memory blocks. A memory block is described by a MEMORY_ALLOC object, and a memory image by a MEMORY_IMAGE object, which has an array of MEMORY_ALLOC objects referenced by MEMORY_IMAGE.Ma and of MEMORY_IMAGE.Count elements. Mi represents an instance of MEMORY_IMAGE, and MM represents the single global instance of GLOBALS.MM To deallocate an image (see FIG. 12), a reference (Mi) to the MEMORY_IMAGE object is passed to a deallocation routine (12.1). The deallocation routine determines if MI.Ma references an array or not (12.2). If so, it iteratively examines each element of the array (12.3), increasing the corresponding pool in MM of type MI.Ma( ).Type by the size of the block's allocation (12.4), freeing the physical memory pages described by MI.Ma( ).Mdl, and freeing the Mdl itself (12.5). When these elements have been processed, it frees the MA array allocation (12.6). The routine then zeros the MI.Ma and MI.Count values (12.7) and returns successful (12.8). To allocate a block (see FIG. 13), a reference to a MEMORY_ ALLOC object (Ma) and a requested size value are passed to the routine (13.1). A default pool in MM is selected according to MM.Current (13.2). If the requested size is greater than the available pages in the pool (MM.Pool(MMCurrent).Maximum–MM.Pool(MM.Current).Total; see 13.3), then the routine examines the value of MM.Current as described further below.

Otherwise, a request is made to the operating system to allocate physical memory pages of the requested size, along with a Mdl that describes them (13.4). If the request is successfully fulfilled (13.5), the pages described by the Mdl (described within the Mdl as an array of Page Frame Numbers—PFNs) are sorted with a heap sorter (13.6), MM.Pool (MM.Current).Total is incremented by the request size (13.7), MA.Mdl is set to reference the Mdl returned by the operating system call, MA.Type is set to the pool type, MM.Current (13.8), and the call returns successful (13.9).

If the operating system allocation request fails (13.5), any allocated physical memory pages are freed, and the possible Mdl object is freed (13.10). The routine then examines the value of MM.Current, as described below.

If a request is too large for the current pool (13.3), or if the operating system allocation request fails (13.5), the routine examines MM.Current (13.11). If it is Reg, then the routine fails. Otherwise, MM.Current is set to Reg (13.12) and the routine start over again (13.2).

To allocate a memory image (see FIG. 14), a reference (Mi) to a MEMORY_IMAGE object is passed to the routine (14.1). The caller has previously set MI.Length to the requested image size. If the requested size is greater than the sum of the pools (MM.Pool(Reg).Total+MM.Pool(PAE).Total; see 14.2), the routine fails (14.12).

Otherwise, the total number of memory blocks (MI.Count), the default block size (MI.Size), its shift (MI.Shift) and mask (MI.Mask), and the size of the last memory block are calculated (14.3). The routine requests the operating system for an allocation for an array of MI.Count number of MEMORY_ALLOC objects (14.4).

In some embodiments, if the allocation fails (14.5), the routine also fails (14.12). Otherwise, the routine iteratively allocates blocks, querying if there are more blocks to allocate (14.6). If not, the routine returns successful (14.10); or else, the routine selects the correct block size (14.7) and requests a memory block allocation (14.8; the memory block allocation routine is described in FIG. 13). If the block allocation request succeeds, the routine iterates to the next block (14.9). Alternatively, previously allocated blocks are freed (14.11) and the routine fails (14.12).

While the bus driver loads the RAM disk's image from the image file, read or write IRPs sent to the FDO driver by the operating system are serviced through the bus driver because until the entire image is loaded from the image file into the RAM disk, incoming IRPs may reference unvalidated (unloaded) regions of the RAM disk. To properly service the IRPs, the FDO driver directly calls a bus driver routine (part of the private interface, see 3.6) to queue and then process the IRPs. The bus driver first validates the region described by the IRP. It then directly calls the FDO routine, which actually performs the read or write. In the following paragraphs, IQ represents an instance of XFR_IRP_QUEUE.

Figure 15:
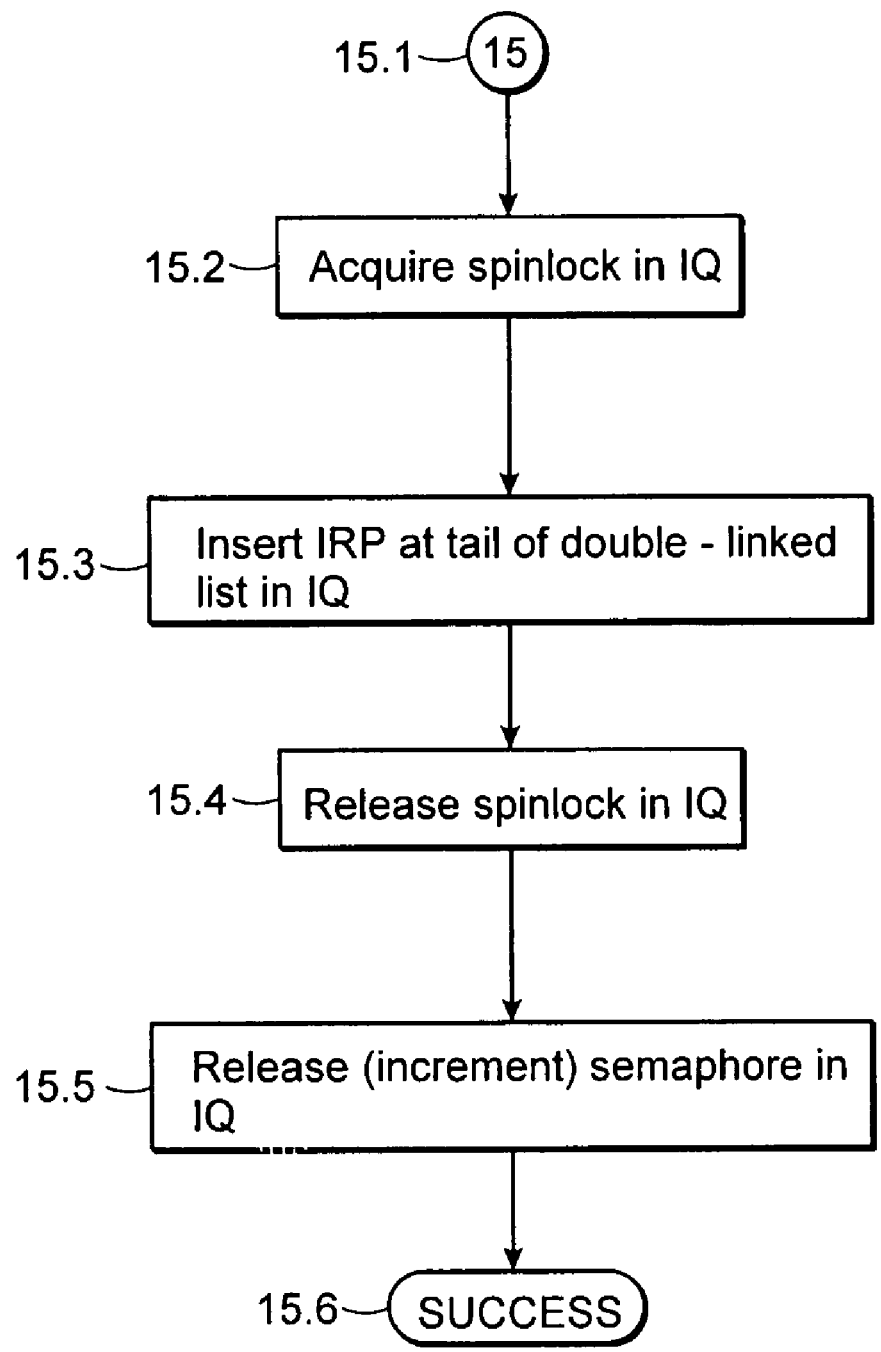
FIGS. 15 and 16 illustrate bus-image transfer-queue and de-queue IRP processes.

To queue an IRP (FIG. 15) a reference to an XFR_IRP_QUEUE object and a reference to the IRP is passed to the routine (15.1). The routine acquires the IQ.Spinlock spinlock (15.2), double-links the IRP at the end of the IQ list (15.3), releases IQ.Spinlock (15.4), releases (increments and signals) the IQ.Semaphore semaphore (15.5), and returns successful (15.6).

Figure 16:
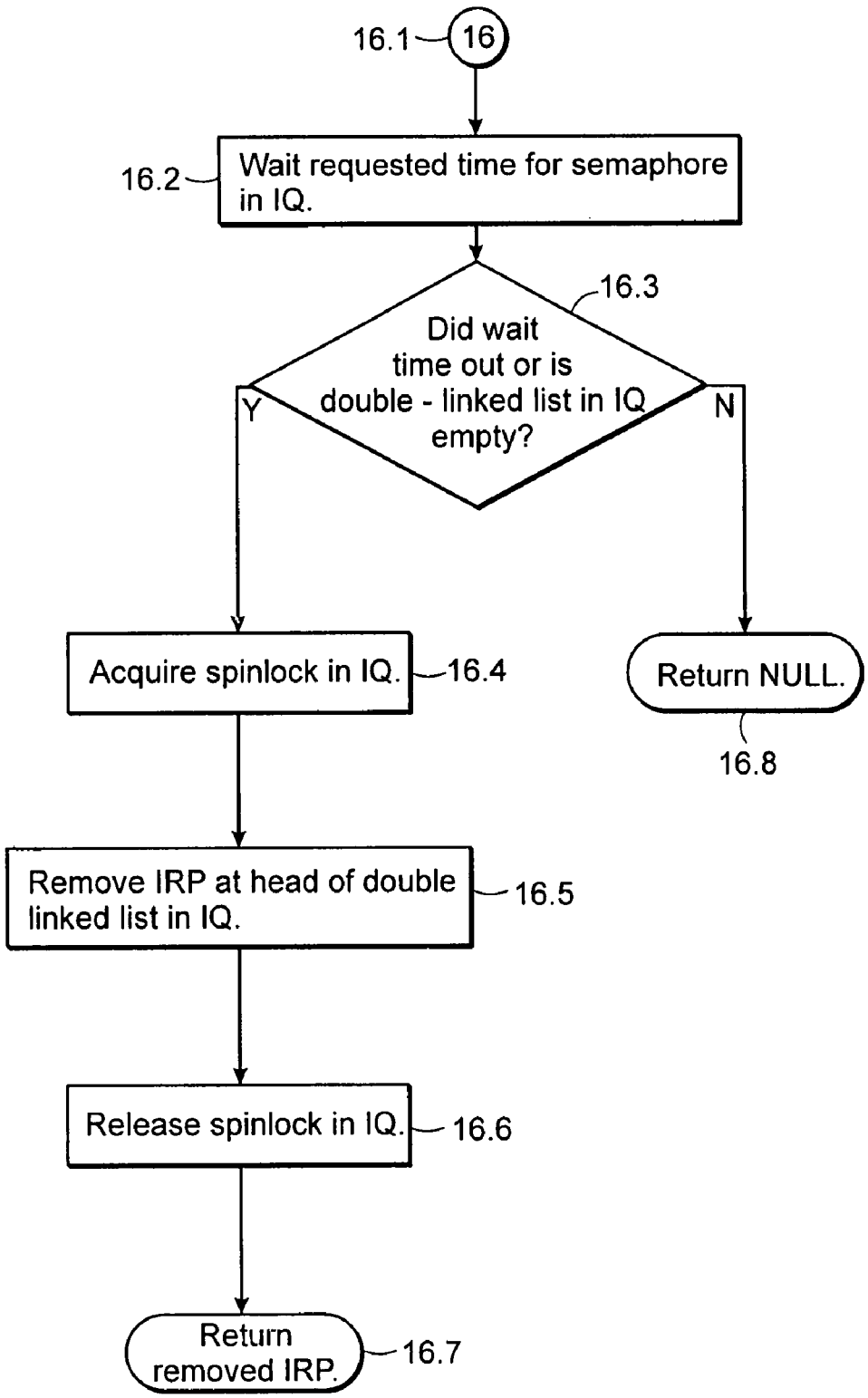

To dequeue an IRP (see FIG. 16), a reference to an XFR_IRP_QUEUE object and a reference to a wait period is passed to the routine (16.1). The wait period may be any value from zero to an infinite wait time. The routine waits the requested period of time for the IQ.Semaphore semaphore to go to the signaled state (16.2). If the wait is fulfilled by a signaled semaphore, the semaphore's count is automatically decremented by one. If the wait operation times out (i.e. the semaphore was not signaled for the duration of the wait period) or the IQ double-link IRP list is empty (16.3), the routine returns a NULL reference to an IRP (16.8).

Otherwise, the routine acquires the IQ.Spinlock spinlock (16.4), removes the IRP at the head of the IQ list (16.5), releases the spinlock (16.6), and returns a reference to the removed IRP (16.7).

Figure 17:
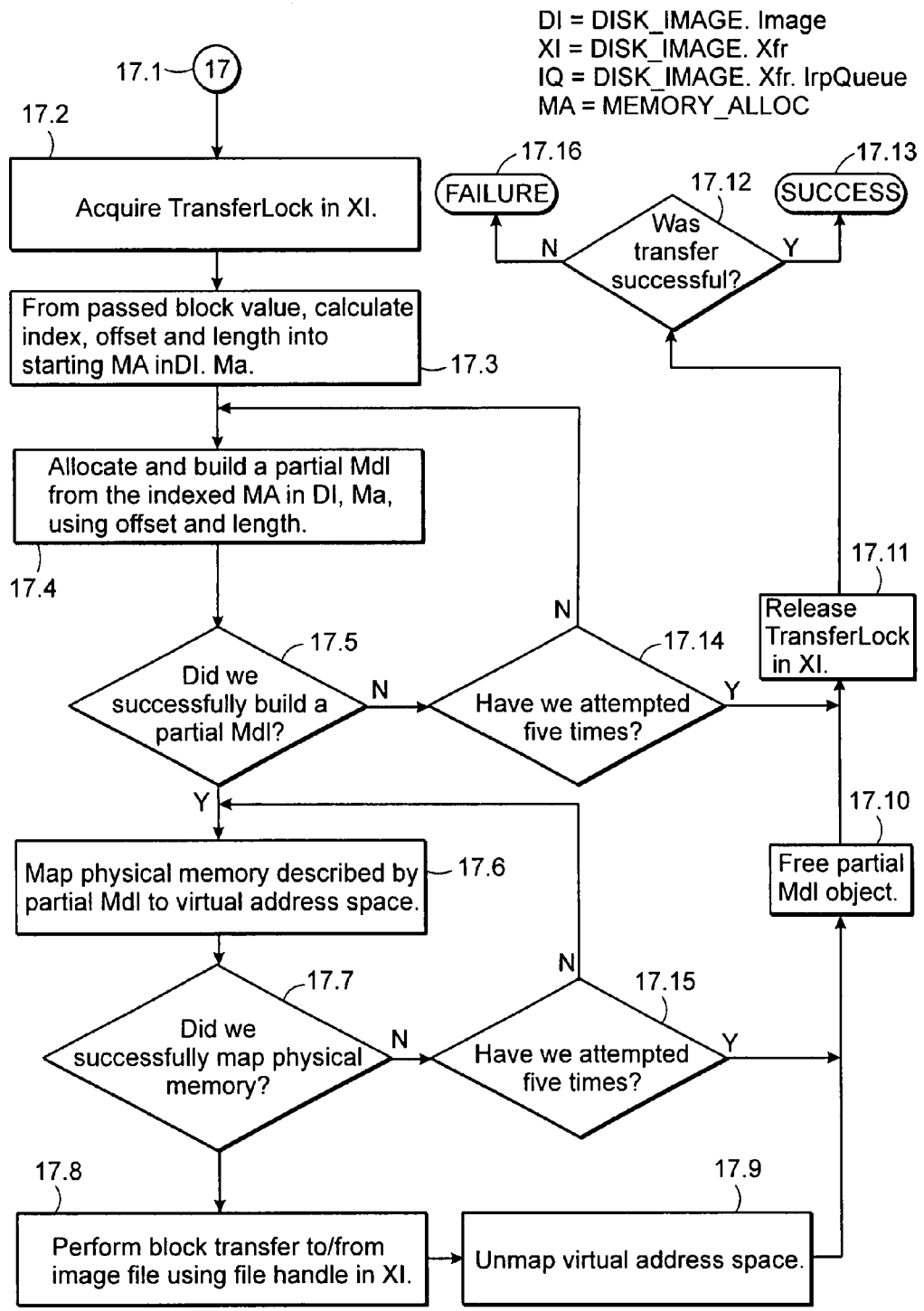
FIG. 17 illustrates a bus-image transfer-transfer block process.

In some embodiments, transfers of data to and from the image file are handled by a single routine (FIG. 17). This routine is passed a reference (DI) to a Disk_IMAGE object, an offset value (ULONGLONG), and the transfer type (read or write; 17.1). First, the routine acquires the DI's transfer lock by waiting for the DI.TransferLock event (17.2). An event object is used for locking instead of a mutex because the operating system's file API is called at IRQL=PASSIVE_LEVEL, and the acquisition of a mutex raises the IRQL to APC_LEVEL. This lock is preferably retained for the entire life of the routine, permitting only one active transfer operation to the image file at a time. This functionality improves transfer performance by disallowing non-sequential intra-block disk operations, and reduces the load on system resources because the virtual address region is mapped 4 MB at a time (the size of a transfer block).

The routine then calculates the block index, offset and length (17.3). Using these values, the routine attempts to allocate a (partial) MDL to describe a portion of the Mdl referenced by DI.MA(index).Mdl (17.4). The routine attempts to allocate and build the partial MDL (17.5, 17.14) some number of times, such as five times. If it fails, the transfer lock is released (the DI.TransferLock event is signaled; 17.11), and the routine fails (17.12, 17.16).

If the partial MDL is successfully built, the routine attempts to map the physical memory described by the partial MDL into virtual address space (17.6). The routine attempts to map the MDL (17.7, 17.15) some number of times, such as five times. If it fails, the partial MDL is freed (17.10), the transfer lock is released (the DI.TransferLock event is signaled; 17.11), and the routine fails (17.12, 17.16).

If the mapping succeeds, the read from or write to the image file is executed via an operating system call using the open handle to the file DI.Handle (17.8). Afterwards, the virtual address space is unmapped (17.9), the partial MDL is freed (17.10), and the transfer lock is released (the DI.TransferLock event is signaled; 17.11). If the read or write operation was successful (17.12), the routine returns successful (17.13), otherwise it returns failure (17.16).

Figure 18:
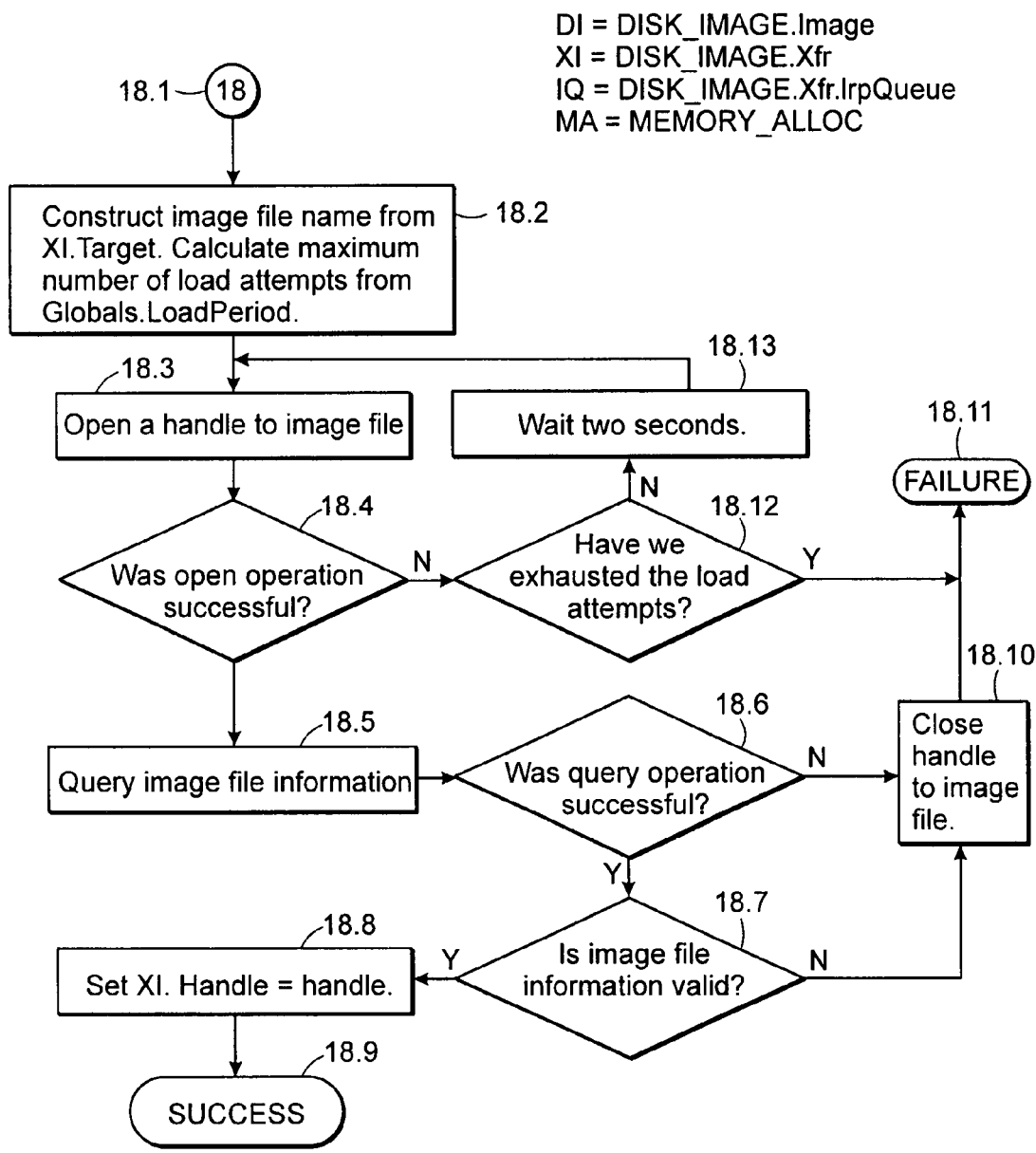
FIG. 18 illustrates a bus-image transfer-open image file process.

To perform transfers to or from the image file using the operating system's API, a handle to the file is opened (FIG. 18). To open a handle, a reference (XI) to a XFR_IMAGE object and a BOOLEAN (Wait) value are passed to the routine (18.1). First, the routine constructs the image file's name from the XI.Target value. It calculates the maximum number of load attempts from the Wait and Globals.LoadPeriod values (18.2).

The routine attempts to open a handle to the image file (18.3). If the open operation failed (18.4), the routine compares the number of attempts made with the maximum number permitted. If the attempts have not been exhausted (18.12), the routine waits for two seconds (18.13), and reattempts the open operation (18.3). If the attempts have been exhausted, the routine returns failure (18.11).

If the open operation succeeds (18.4), the routine queries information about the file (18.5). If the query operation fails (18.6), or the information is invalid (18.7), the handle is closed (18.10), and the routine returns failure (18.11). Otherwise, XI.Handle is set to the value of the open handle (18.8), and the routine returns success (18.9).

Figure 19:
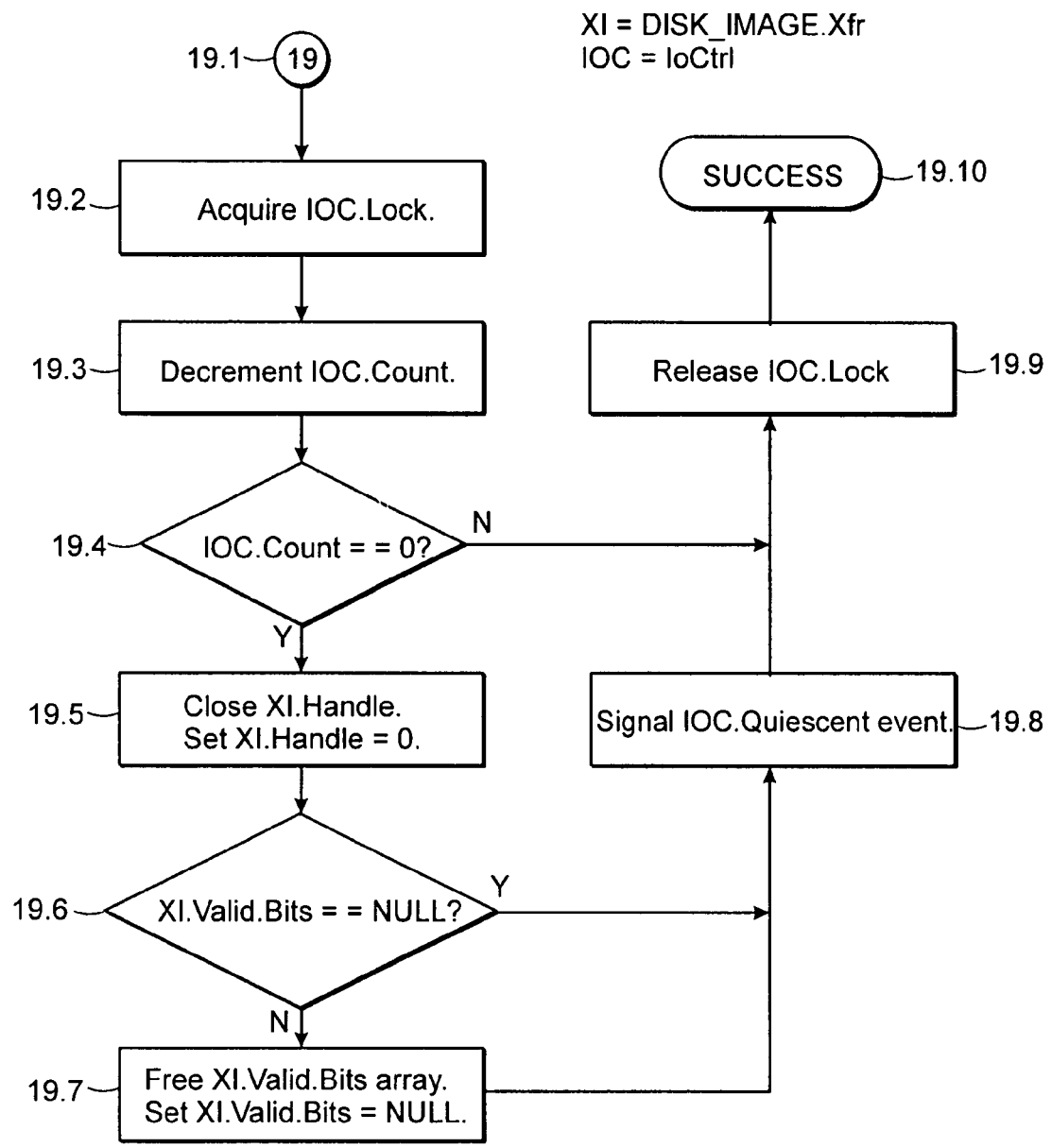
FIG. 19 illustrates a bus-image transfer-close image file process.

When the transfer operations to and from the image file are completed, the open handle to the file is closed (FIG. 19). Because image load and save operations may run concurrently, access to their shared resources is synchronized. Load and save operations share the open file handle (XI.Handle) and a possible bit array (XI.Valid.Bits); this routine controls their release.

The routine is passed a reference (XI) to a XFR_IMAGE object (19.1). First, the lock (XI.IoCtrl.Event) to the XI.IoCtrl object is acquired (19.2), and the XI.IoCtrl.Count value is decremented (19.3). If XI.IoCtrl.Count is not zero (19.4), the lock is released (19.9), and the routine returns successful (19.10).

If XI.IoCtrl.Count is zero (19.4), the XI.Handle is closed and XI.Handle is set to NULL (19.5). If XI.Valid.Bits is not NULL (19.6), the array referenced by XI.Valid.Bits is freed, and XI.Valid.Bits is set to NULL (19.7). Additionally, XI.Io-Ctrl.Quiescent is signaled (19.8), the lock at XI.IoCtrl.Lock is released (19.9), and the routine returns successful (19.10).

As described earlier, when the operating system notifies system components of system shutdown, the bus driver responds by writing out, or saving, the RAM disk image to the image file. This process essentially creates a backup copy of the RAM disk into its image file on the backup hard disk so that another similar RAM disk can be reproduced later containing the same data that was backed up into the image file.

Notification of shutdown may be received even while the bus driver is loading the image and servicing read and write IRPs queued by the FDO driver. In one or more embodiments, only those portions of the image that are valid are saved, since the RAM disk's image itself may not be completely valid (loaded). While the load and/or save operations are executing, it is possible that the bus driver receives notification of device removal. These activities are properly handled by the image load and save routines.

Figure 20:
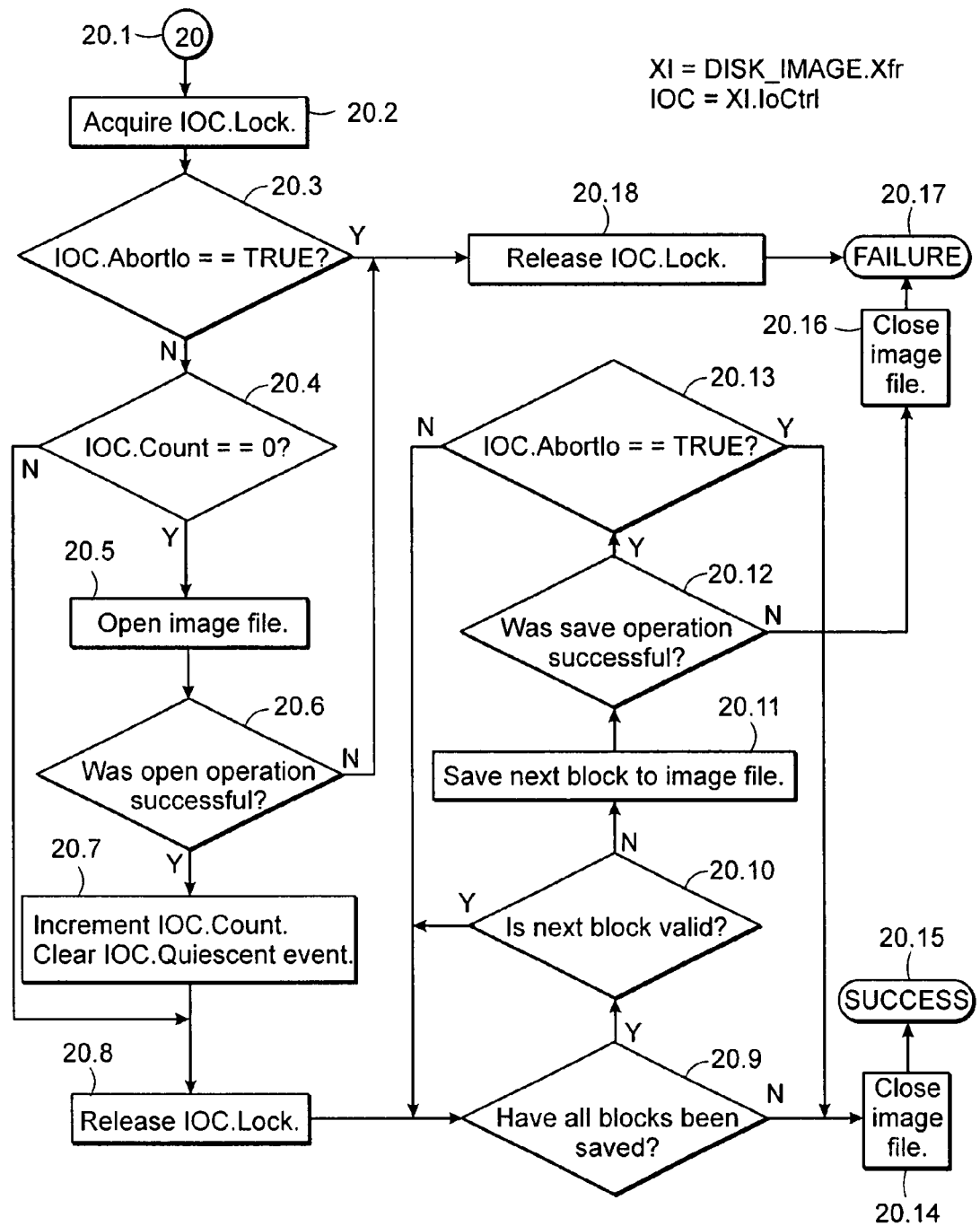
FIG. 20 illustrates a bus-image transfer-save image file process.

To save the RAM disk's image (FIG. 20), a reference (DI) to a DISK_IMAGE object is passed to the routine (20.1). First, the routine acquires the lock at DI.IoCtrl.Lock (20.2), and checks if DI.IoCtrl.AbortIo is TRUE (20.3). This value is set to TRUE when the save (or load) routines are aborted. If TRUE, the lock is released (20.18), and the routine returns failure (20.17).

Otherwise, if DI.IoCtrl.Count is not zero (20.4), the routine attempts to open the image file (20.5; see FIG. 18). If the open operation was not successful (20.6), the routine releases the lock at DI.IoCtrl.Lock (20.18), and returns failure (20.17). If successful, the routine increments DI.IoCtrl.Count and clears the DI.IoCtrl.Quiescent event (20.7).

In some embodiments, DI.IoCtrl.Count is not zero. This value is a reference count to the number of threads using the file's handle and validation bit array. The routine releases the DI.IoCtrl.Lock (20.8), and iterates though the blocks, attempting to save only the valid ones (20.9-20.13). The iterative loop begins: if all blocks have been saved (20.9), then the routine closes the image file (20.14; see FIG. 19), and returns success (20.15).

The routine checks if the next candidate block to be saved is valid (20.10). If not, it tries the next block (20.9). If so, it attempts to save the candidate block to the image file (20.11). If the save operation was not successful (20.12), the routine closes the image file (20.13, FIG. 19) and returns failure (20.17). Otherwise, if DI.IoCtrl.AbortIo is TRUE, the routine closes the image file (20.14; see FIG. 19), and returns successful (20.15). Else, the routine iterates to the next candidate block (20.9).

As previously noted, after the RAM disk's memory image is allocated, its contents is loaded from the image file. The process of loading the RAM disk's image may be considered as validating the RAM disk's image, since a region of the image that has not been loaded has invalid data. The process of loading the image begins during operating system initialization ("boot"), as soon as the operating system grants access to (i.e. allows the bus driver to open) the image file.

Figure 21:
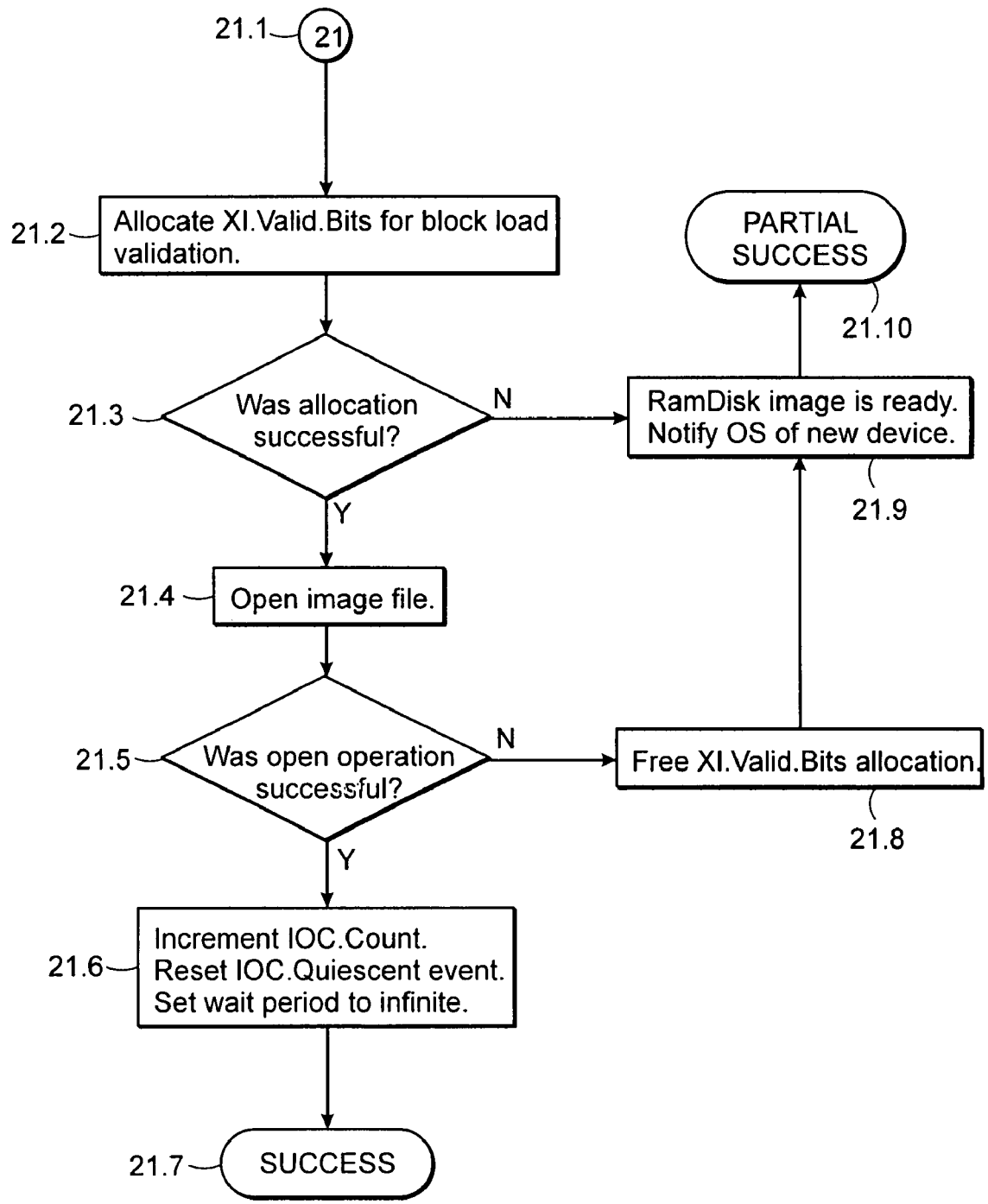
FIG. 21 illustrates a bus-image transfer-load image file process.
Figure 22A:
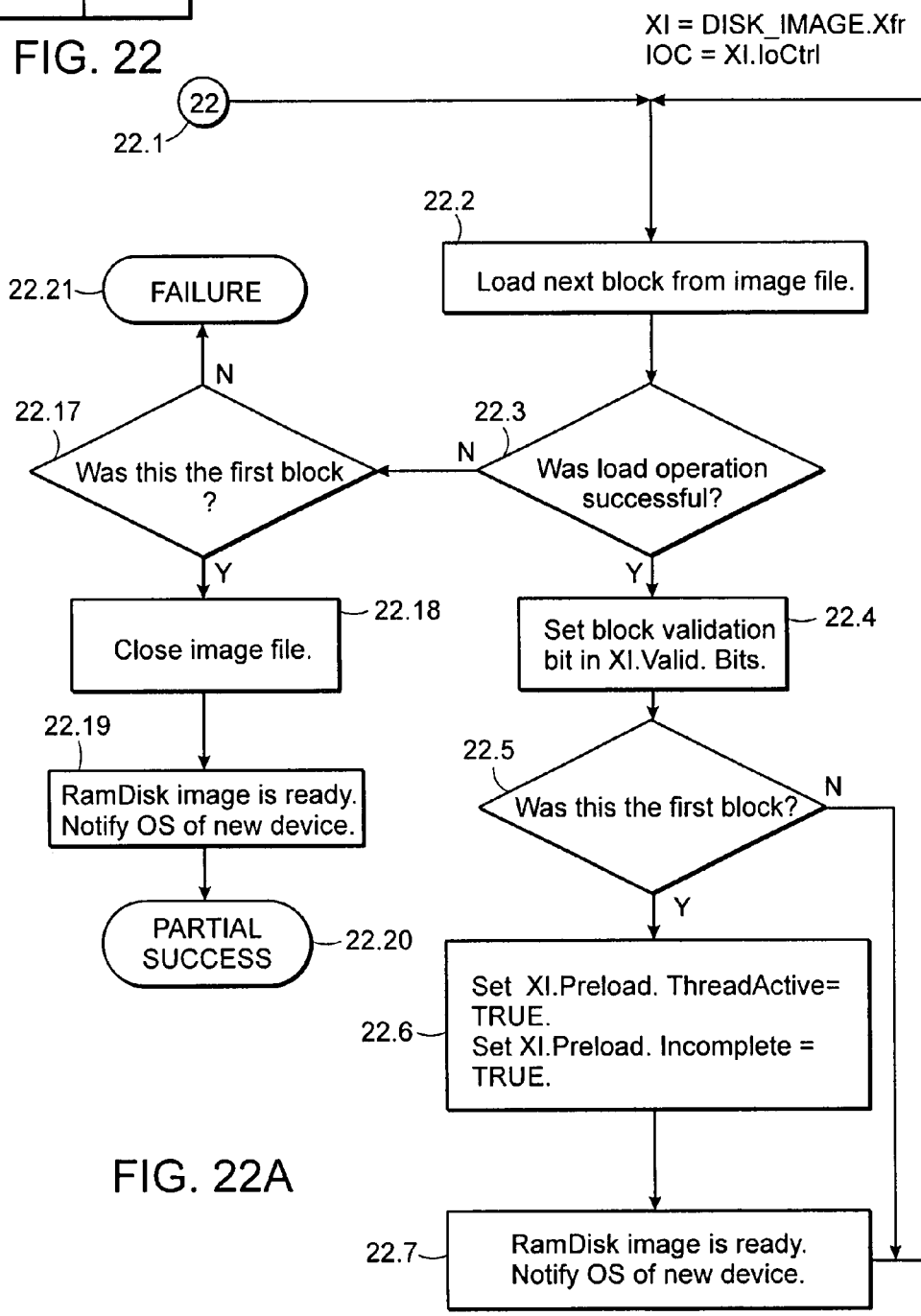
FIGS. 22-26 illustrate bus-image transfer-load image file processes.
Figure 22B:
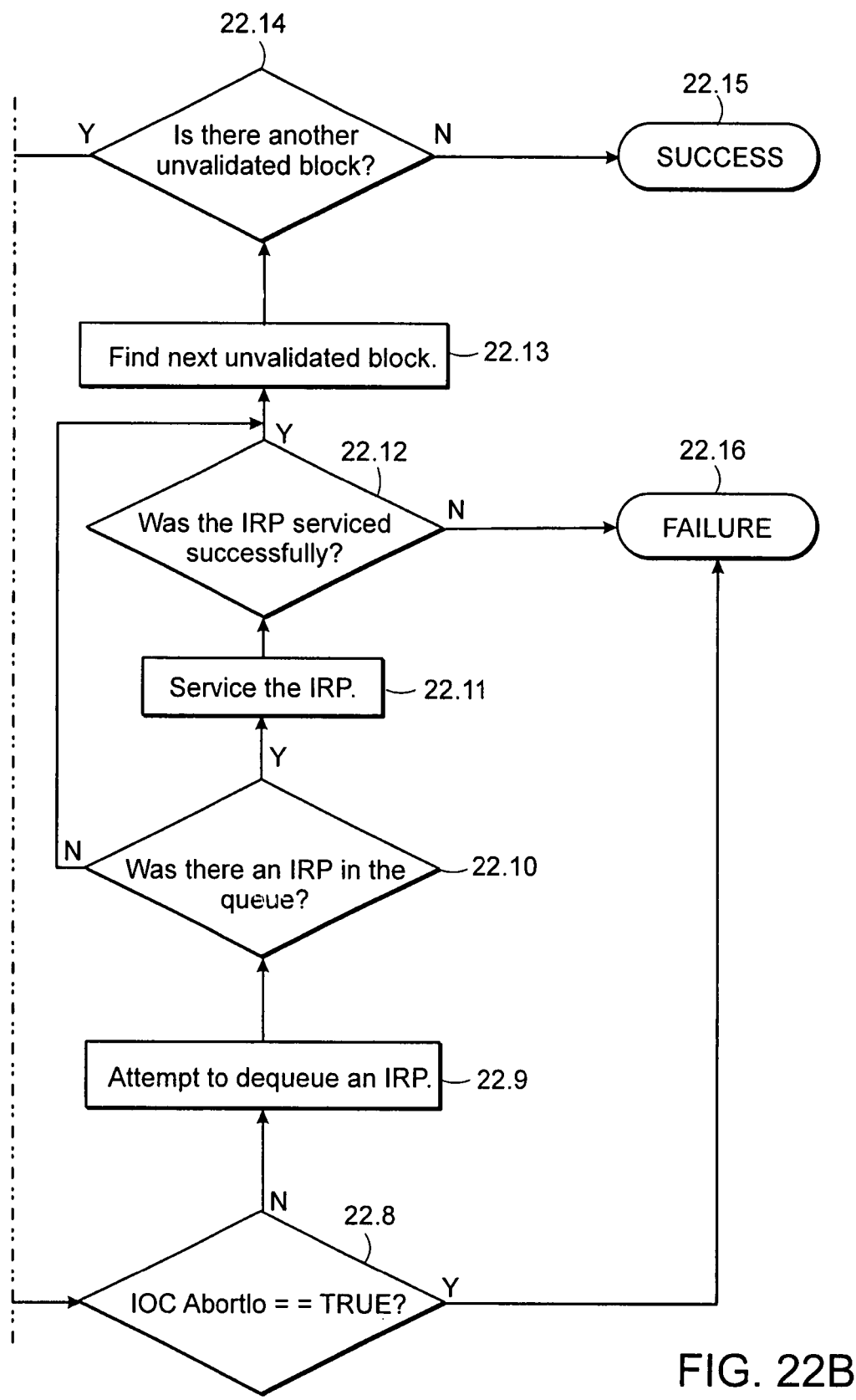
Figure 23B:
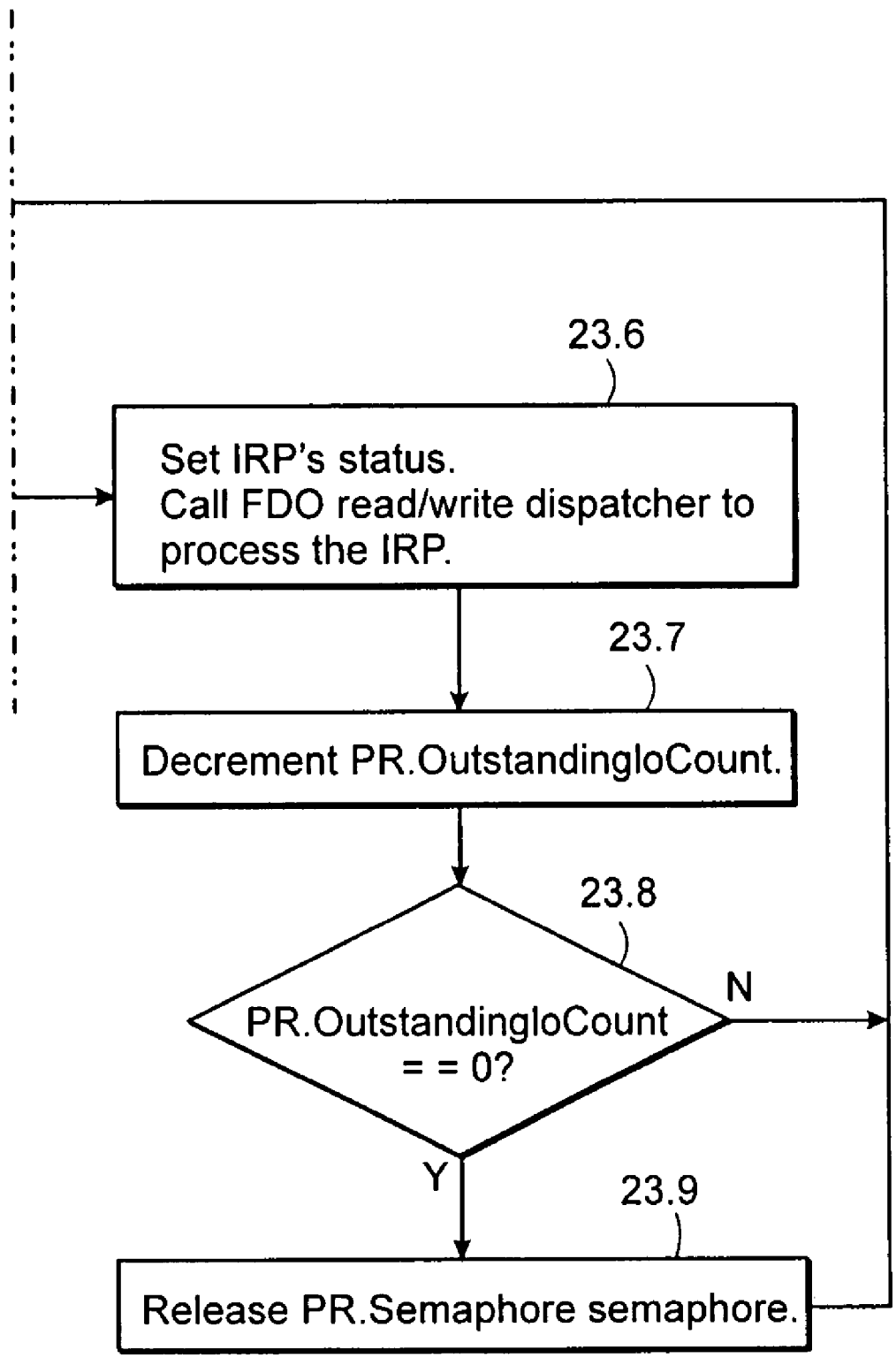

FIGS. 21-23 illustrate an exemplary load process in three parts: FIG. 21 is initialization; FIG. 22, the main body; and FIG. 23, clean-up. The main body routine is executed after the initialization routine if that routine returns success (not partial success). The clean-up routine is executed after the main body routine, if that routine returns success or failure (not partial success).

To initialize loading of the RAM disk's image (FIG. 21), a reference (DI) to a Disk_IMAGE object is passed to the routine (21.1). First, the routine attempts to allocate an array of bits referenced by DI.Xfr.Valid.Bits, to represent the validation state of each block to be loaded (21.2). If the allocation fails (21.3), the routine flags the RAM disk image as "ready" (albeit, completely empty), and notifies the operating system of the arrival of the new device (21.9). The routine returns "partial success," meaning that the RAM disk's image was allocated and is usable, but its image could not be loaded (21.10).

If the allocation was successful (21.3), the routine attempts to open the image file (21.4; see FIG. 18). If the open operation was not successful (21.5), the routine frees the bit array referenced by DI.Xfr.Valid.Bits (21.8), and presents the RAM disk to the operating system as described above (21.9, 21.10). Otherwise, the routine increments DI.Xfr.IoCtrl. Count and clears the DI.Xfr.IoCtrl.Quiescent event (21.6), and returns success (21.7).

If the load initialization routine completes with success, the loading of the image begins (see FIG. 22). This routine is passed a reference (DI) to the Disk_IMAGE (22.1). At this point, the next block to be loaded from the image file is the first block.

The routine attempts to load the next block from the image file (22.2). If the load operation fails (22.3), and the block to be loaded was not the first block (22.17), the routine returns failure (22.21). If the load operation fails (22.3), and the block to be loaded was the first block (22.17), the routine closes the image file (22.18; FIG. 19), flags the RAM disk image as "ready" (albeit empty), and notifies the operating system of the arrival of the new device (22.19). The routine returns "partial success", where the RAM disk's image was allocated and is usable, but its image could not be loaded (22.20).

Otherwise, the load operation succeeded (22.3), and the routine sets the bit in DI.Xfr.Valid.Bits representing the block (22.4). If the loaded block was the first block (22.5), the routine sets DI.Xfr.Preload.ThreadActive and DI.Xfr.Preload.Incomplete to TRUE (22.6), flags the RAM disk image as "ready", and notifies the operating system of the arrival of the new device (22.7).

Figure 24:
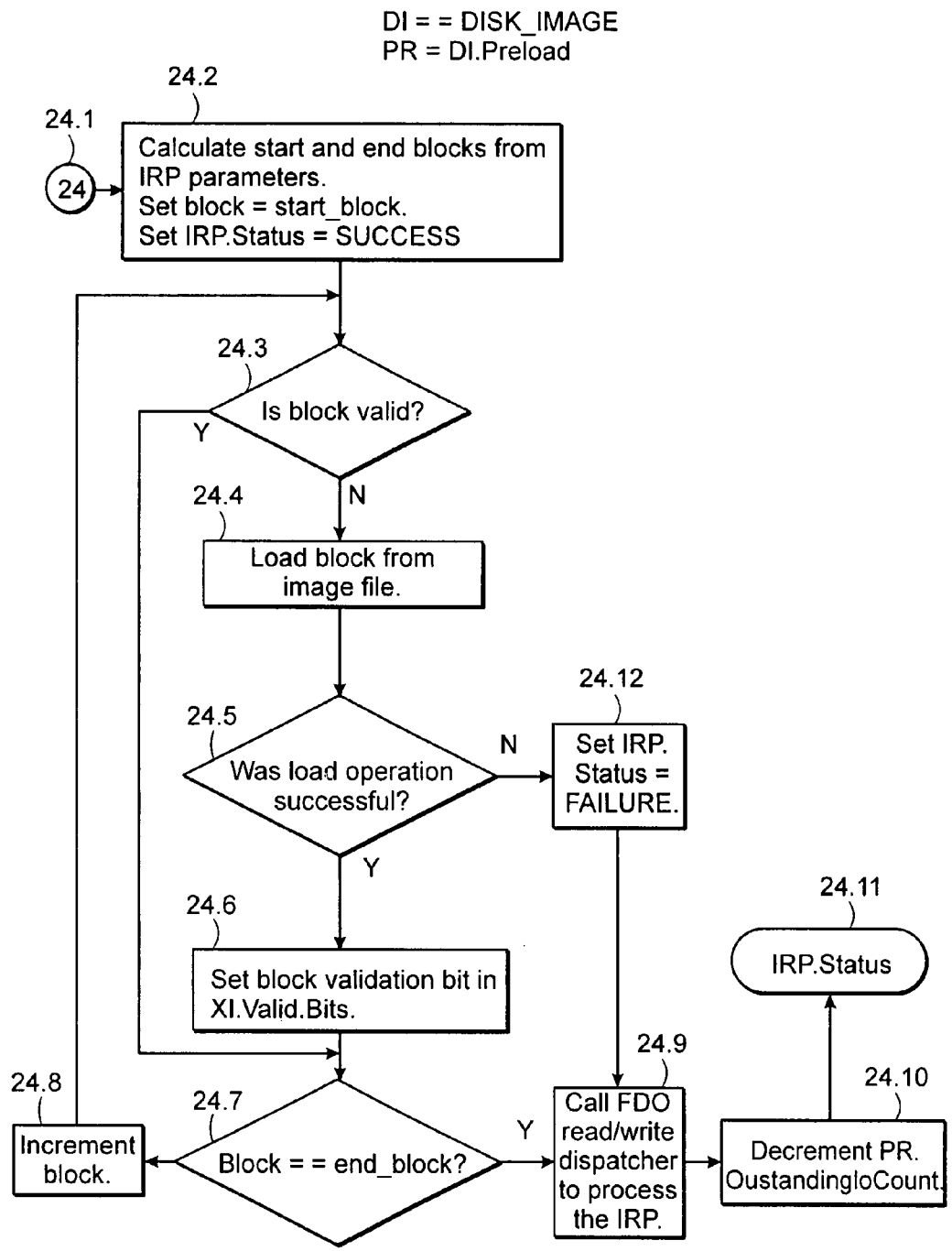

If DI.IoCtrl.AbortIo is TRUE (22.8), the routine returns failure (22.16). Else, the routine attempts to dequeue an IRP (22.9). If an IRP was dequeued (22.10), the routine services the IRP (22.11; FIG. 24), and, if the service failed (22.12), the routine returns failure (22.16).

Otherwise, the routine finds the next unvalidated block by sequentially scanning the bits in DI.Xfr.Valid.Bits. If there are no more unvalidated blocks (22.14), the routine returns success (22.15). Else, the routine loads the next block (22.2) and continues.

The load routine interleaves requests to service IRPs with its own sequential loading, block by block, of the RAM disk's image. If no IRPs are present in the IRP queue, the blocks are loaded from start to finish. If an IRP is always present in the IRP queue, the routine services one IRP, then loads one block, and repeats the process until all blocks are validated or an error occurs.

In some embodiments, the load process' main body returns one of three values: success, partial success, or failure. If the main body returns success or failure (not partial success), the clean-up routine is executed (FIG. 22). At some point while loading the image, the bus driver notifies the operating system of a new RAM disk device (22.7). From the time of the notification forward, the FDO driver may be loaded, and read and write IRPs targeting the RAM disk FDO may be sent to the FDO driver. While the bus driver is validating the RAM disk's image, the FDO driver will call the bus driver to queue and service these IRPs.

Figure 26:
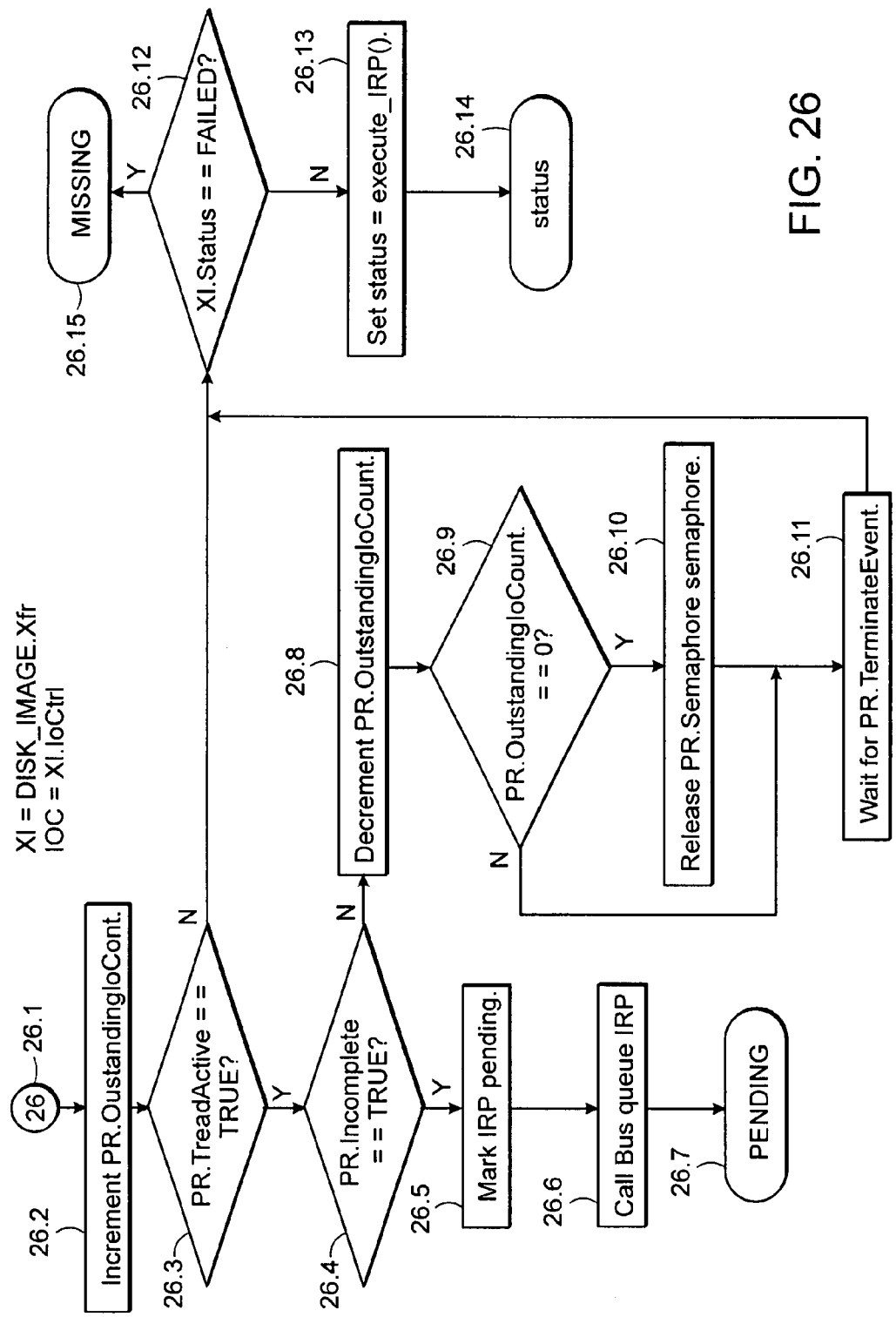

If the bus driver successfully completes image validation, or if the validation operation fails after notifying the operating system of the new RAM disk device, or if the IRP service routine fails, then the bus driver retargets incoming IRPs so that they are no longer processed by it (the bus driver) but by the FDO driver. The retargeting operation is handled by the clean-up routine (FIG. 23). The clean-up routine is passed a reference (DI) to a Disk_IMAGE object (23.1). First, the routine sets DI.Xfr.Preload.Incomplete to FALSE (23.2). This action causes the threads carrying the read and write IRPs dispatched by the operating system to the FDO driver to block (FIG. 26). Then, the routine checks if DI.Xfr.Preload.OutstandingIoCount is zero (23.3). This value represents IRPs that have not been completed but are not blocked. If it is not zero, the routine attempts to dequeue an IRP (23.4). The dequeuer can wait indefinitely until the semaphore it is waiting for is signaled.

If DI.Xfr.Preload.OutstandingIoCount is zero (23.3), or if no IRP was dequeued (23.5), the routine signals the DI.Xfr.Preload.TerminateEvent event and sets DI.Xfr.Preload.ThreadActive to FALSE (23.10). Signaling the event caused any blocked threads carrying read or write IRPs to unblock (FIG. 26). Setting ThreadActive to FALSE, essentially closes the private interface between the bus and FDO drivers. The routine then closes the image file (23.11; See FIG. 19), and returns successful (23.12).

Figure 31:
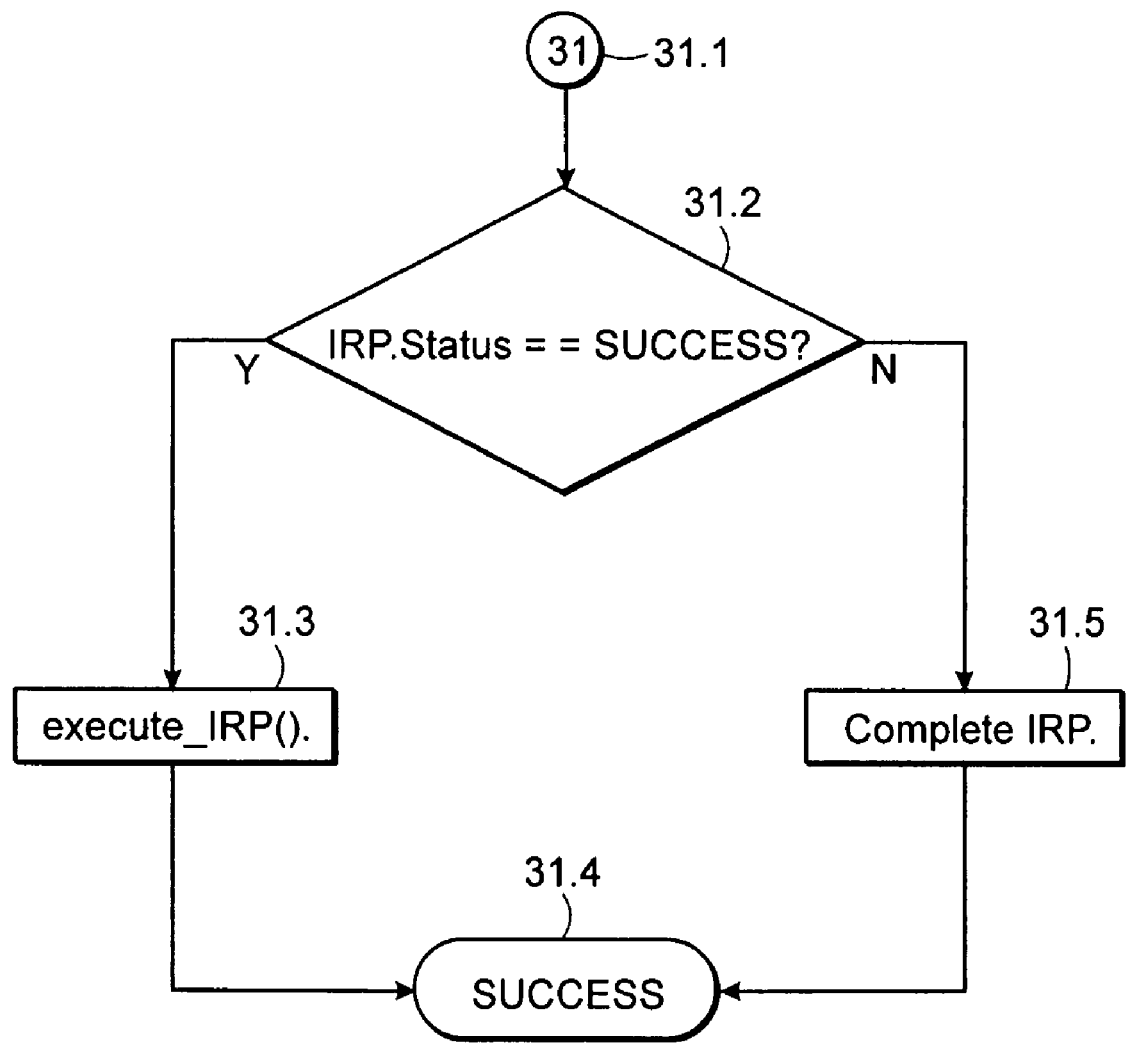
FIG. 31 illustrates a FDO-read/write dispatcher.

If an IRP was dequeued (23.5), the routine sets the IRPs status according to the status the main body returned. If the main body completed successfully, the routine sets the IRP's status to success, else to failure, and then calls the FDO read/write dispatcher referenced by DI.Xfr.Rd_PreloadReadWrite, passing it a reference to the IRP (23.6; FIG. 31). Afterwards, the routine decrements DI.Xfr.Preload.OutstandingIoCount (23.7), and, if the value has reached zero (23.8), it releases (increments) the semaphore referenced at DI.Xfr.Preload.Semaphore.

The routine then loops back to attempt to dequeue another IRP (23.4). When the last outstanding I/O operation (IRP) is completed, the semaphore is incremented without an IRP being inserted in the queue. This state (a signaled queue semaphore and no items in the queue) signals the termination of the queue. The subsequent call to dequeue an IRP, returns a null IRP reference. The null reference tells the routine that queue processing should now terminate.

While validating the RAM disk's image, the bus driver is responsible for processing read and write IRPs targeted at the FDO device. Its function in this regard is preferably limited to assuring that the disk region that each IRP targets is valid (FIG. 24). The routine that validates regions for IRPs is passed a reference to the IRP and a reference (DI) to a Disk_IMAGE object (24.1). First, the routine examines the IRP, calculates the start and end blocks (transfer blocks) that are to be validated to complete the IRP, and sets the IRP's status to success (24.2).

The routine then proceeds to iterate through the blocks from start to end (24.3-24.8). If the candidate block is not valid (24.3), it loads the block from the image (24.4). If the operation fails (24.5), the routine sets the IRP's status to failure (24.12), calls the FDO read/write dispatcher referenced at DI.Xfr.Rd_PreloadReadWrite (24.9), decrements the outstanding I/O count at DI.Xfr.Preload.OutstandingIoCount (24.10), and returns the IRP's status (24.11).

If the load operation is successful (24.5), the routine marks the block as valid by setting the corresponding bit in the bit array referenced by DI.Xfr.Valid.Bits (24.6). It then checks if the last block has been validated (24.7). If not, it increments the candidate block and loops back (24.3). If so, it calls the FDO read/write dispatcher referenced at DI.Xfr.Rd_PreloadReadWrite (24.9), decrements the outstanding I/O count at DI.Xfr.Preload.OutstandingIoCount (24.10), and returns the IRP's status (24.11).

Figure 14:
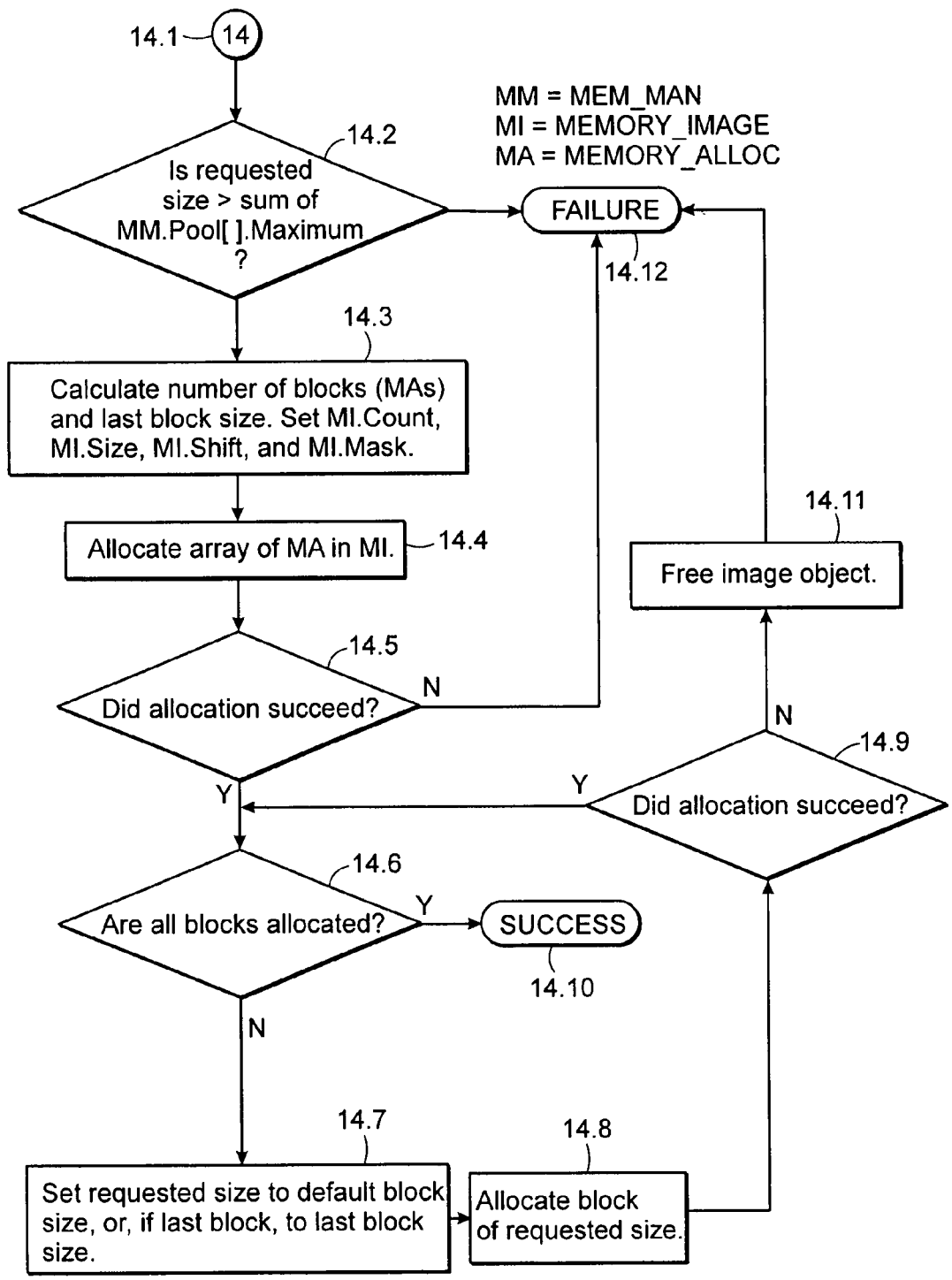
FIG. 14 illustrates image allocation in a bus memory manager.
Figure 25:
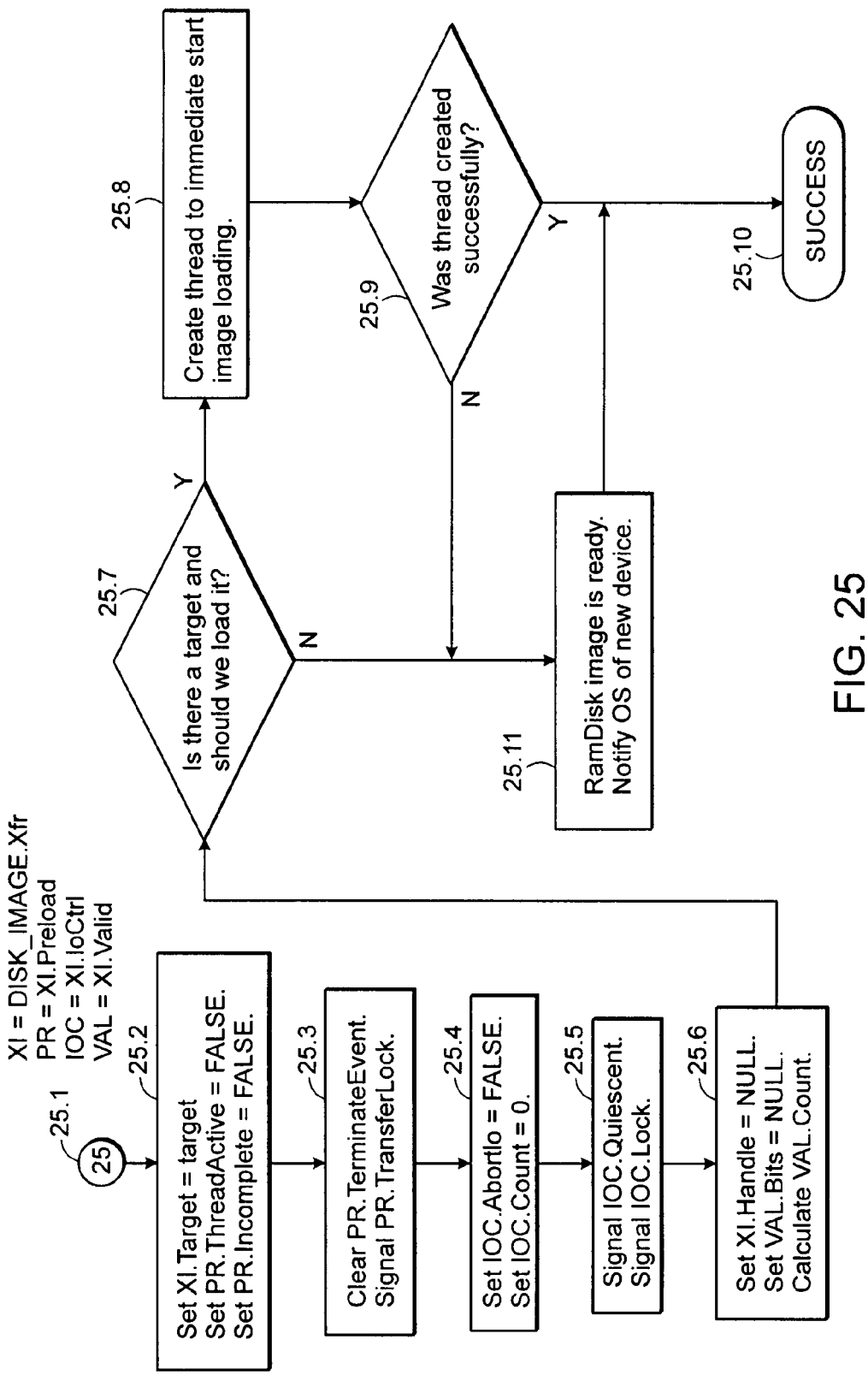

The Image Manager (5.9) is represented by the Disk_IMAGE object. This object, in turn, includes two objects: a MEMORY_IMAGE and a XFR_IMAGE. The XFR_IMAGE object is initialized (FIG. 25) immediately after the MEMORY_IMAGE object's initialization is completed (FIG. 14).

The routine is passed a reference (XI) to a XFR_IMAGE object, a WCHAR Target value describing the volume on which the image file is located, and a BOOLEAN DoLoad value indicating if the RAM disk's image should be loaded from its image file (25.1). First, the routine sets XI.Target to Target and both XI.Preload.ThreadActive and XI.Preload.Incomplete to FALSE (25.2). It clears the XI.Preload.TerminateEvent event and signals the XI.Preload.TransferLock event (25.3). These XI.Preload settings represent a "no image loading" state.

The routine then sets XI.IoCrtl.AbortIo to FALSE and XI.IoCtrl.Count to 0 (25.4), and signals the XI.IoCtrl.Quiescent and XI.IoCtrl.Lock events (25.5). These XI.IoCtrl settings represent a "no transfer activity" state.

The routine then sets XI.Handle and XI.Valid.Bits to NULL, calculates the number of ULONGs that contain the bits used to represent the validation state of the RAM disk image, and stores the value in XI.Valid.Count (25.6). These XI.Valid settings represent a "no transfer activity" state.

If Target is zero or DoLoad is FALSE (25.7), the routine flags the RAM disk image as "ready" and notifies the operating system of the arrival of the new device (25.11), and returns "success" (25.10). Else, the routine attempts to create a thread to iMMediately start loading the RAM disk's image from the image file (25.8). A reference to the thread is kept at XI.Preload.Thread. If the thread was not successfully created (25.9), the routine flags the RAM disk image as "ready" and notifies the operating system of the arrival of the new device (25.11). In either case, the routine returns successful (25.10).

The reason the routine returns success even when the image is not loaded is because the RAM disk memory image was successfully allocated and can be used, although it is empty. The return value does not indicate the status of the image itself, i.e., whether it was loaded or not.

A relationship exists between the bus and FDO drivers while the RAM disk's image is being loaded. Since the RAM disk typically spends most of its life cycle not loading its image, the FDO driver need access the private bus interface only during image loading. Once complete, the FDO driver can effectively decouple itself from the bus driver. Half the decoupling mechanism is present in the bus driver (FIG. 23) and the other half in the FDO driver (FIG. 26).

The FDO driver routine responsible for decoupling is passed a reference (XI) to a XFR_IMAGE object and a reference to an IRP (26.1). The routine returns a value to the operating system, and its return value is to be understood in the context of processing an read or write dispatch IRP. The return value "missing" means the device has logically disappeared; the IRP failed. The return value "pending" means the device will service the IRP by means of a different thread. The return value "success" means the device has serviced the IRP successfully.

First, the routine increments the outstanding I/O count at XI.Preload.OutstandingIoCount (26.2). If XI.Preload.ThreadActive is FALSE (26.3), the routine checks the current transfer status at XI.Status (26.12). If the status is "failed", the routine returns "missing." Else, the routine executes the FDO driver's read/write IRP dispatch (26.13) and returns its status (26.14).

If XI.Preload.ThreadActive is TRUE (26.3), the routine check the value of XI.Preload.Incomplete (26.4). If it is TRUE, the routine marks the IRP pending (26.5), calls the Bus driver to queue the IRP using the routine referenced by XI.Bus_PreloadQueueIrp( ) (26.6), and returns "pending" (26.7).

If XI.Preload.Incomplete is FALSE (26.4), the routine decrements the outstanding I/O count at XI.Preload.OutstandingIoCount (26.8), and checks if it is zero (26.9). The routine releases (increments) the semaphore at XI.Preload.Semaphore (26.10) if the count is zero. In either case, the routine then waits for the event reference by XI.Preload.TerminateEvent (26.11).

When the event is signaled, the routine checks the current transfer status at XI.Status (26.12). If the status is "failed", the routine returns "missing". Else, the routine executes the FDO driver's read/write IRP dispatch (26.13) and returns its status (26.14).

The FDO driver begins decoupling when the bus driver set the XI.Preload.Incomplete flag to FALSE (23.2). FROM that time forward, incoming IRPs block (26.4, 26.8-26.11) on the event XI.Preload.TerminateEvent. During this time, the outstanding I/O count may increase and decrease, but at some point it reaches zero. This is because the operating system sends a limited number of read/write IRPs. When a count of zero is reached, the XI.Preload.Semaphore semaphore is released (incremented) without a corresponding IRP (26.9, 26.10, 23.8, 23.9). When the Bus driver empties the queue (23.4), there is an extra count on the semaphore (23.5), resulting in the terminate event XI.Preload.TerminateEvent being signaled (23.10). This frees any blocked threads (26.11), allowing them to be executed asynchronously.

Next, the bus driver sets XI.Preload.ThreadActive to FALSE (23.10), completely decoupling the bus driver's load code and the FDO driver's read/write dispatch code. From then on, threads carrying read/write IRPs are not queued and can execute asynchronously. On a hardware platform with multiple processors, the processors may be used to execute read and write requests simultaneously and with almost no synchronization mechanisms to impede performance.

The RAM disk's image is saved before the system hardware is powered down or the system restarted and the contents of RAM are lost. Before powering down the hardware or restarting the system, the operating system sends shutdown notification to all devices registered to receive such. The RAM disk uses this notification to save the RAM disk's image to the image file, thus preserving the image for the next time the machine is restarted. The operating system sends the notification to the device in the form of an IRP, targeting its own special dispatch routine. Until the IRP is completed, or the thread carrying the IRP returns, the operating system will not proceed to restart or to power down the hardware.

The FDO driver registers to receive shutdown notification. Additionally, drivers that are layered above the FDO driver may also receive shutdown notification and pass it down to the FDO driver. The FDO driver processes only one such notification at a time. If a notification is received while the first is being processed, the thread carrying the later notification is blocked until the first completes. Then all notifications return with the status of the first.

Additionally, an idle period is maintained after the completion of a shutdown notification. The purpose of the idle period is to prevent writing out an unchanged RAM disk image multiple times sequentially. A new notification received during the idle period simply returns with the status of the previously completed notification.

Figure 27B:
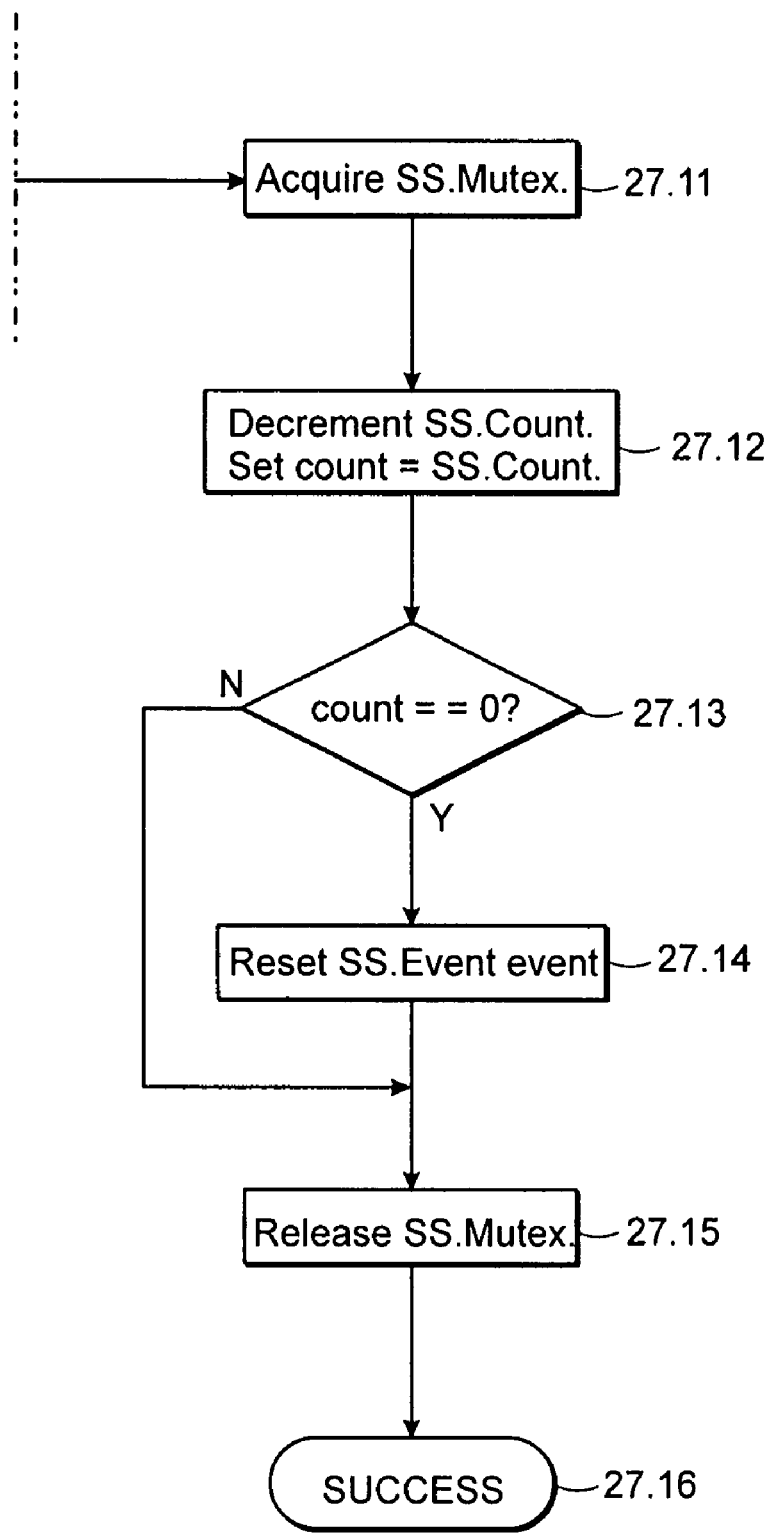
FIG. 27 illustrates a bus-shutdown IRP process.

The routine implementing this feature (FIG. 27) is passed a reference to the shutdown IRP and a reference (SS) to a SHUTDOWN_SYNC object (27.1). First, the routine acquires the SS.Mutex mutex (27.2), retrieves the value of SS.Count and increments SS.Count (27.3), and releases the mutex (27.4).

If the count was initially not zero (27.5), the routine waits for the SS.Event event to be signaled (27.6). If the count was initially zero (27.5), the routine calculates the number of system ticks that have elapsed since the last notification (27.7). If the last save status, SS.Status, was not successful or the idle time has elapsed (27.8), the routine attempts to save the image to the image file, saving the returned status in SS.Status and the system tick count in SS.Ticks (27.9). In either case, the routine then signals the SS.Event event (27.10).

After waiting for the SS.Event (27.6), or signaling the SS.Event (27.10), the routine acquires the SS.Mutex mutex (27.11), decrements the SS.Count value and retrieves it (27.12). If the value is zero (27.13), the routine clears the SS.Event event (27.14). Then the routine releases the SS.Mutex mutex (27.15), and returns successful (27.16).

Figure 28:
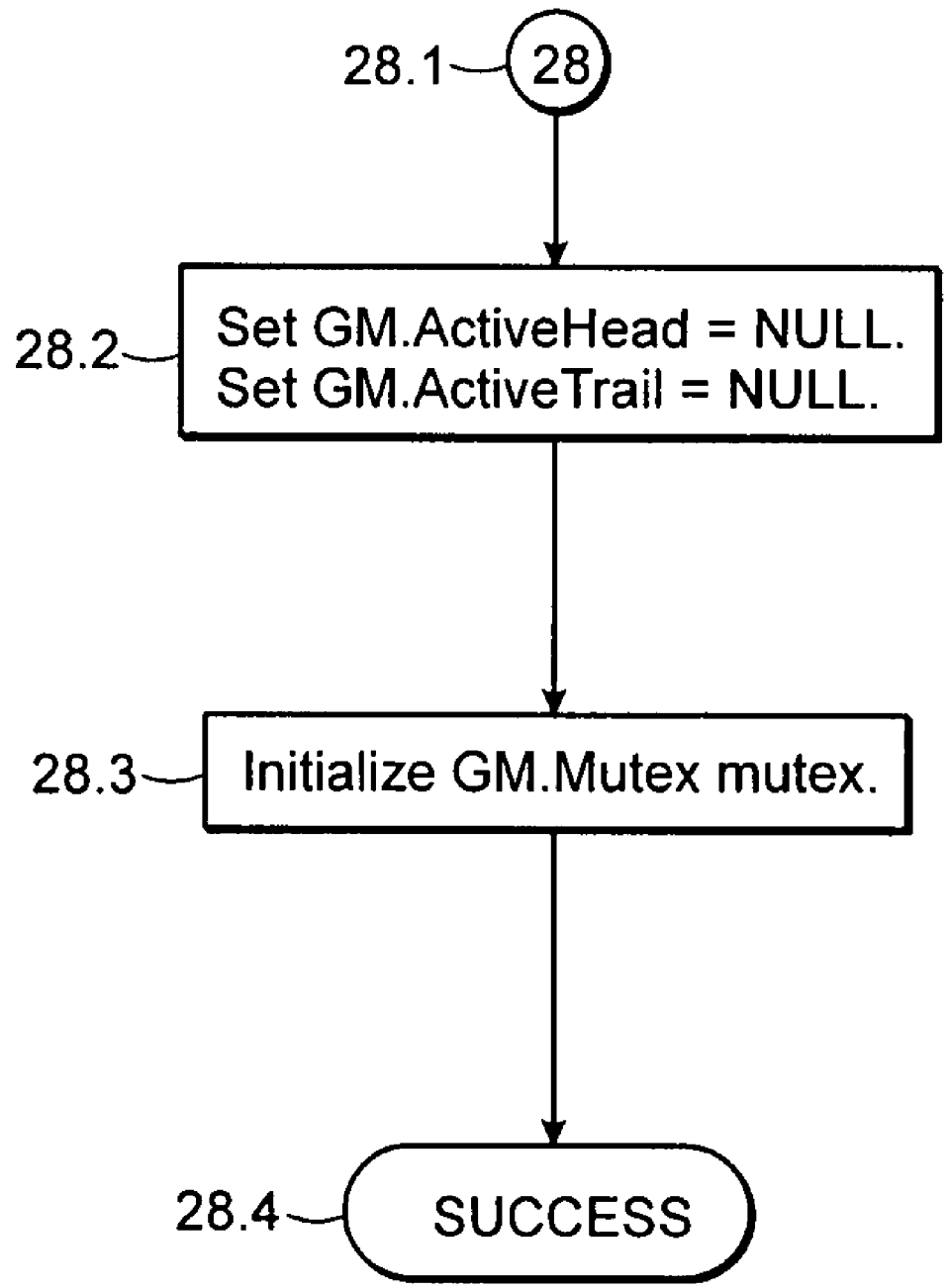
FIG. 28 illustrates a FDO-gate-initialization process.
Figure 29:
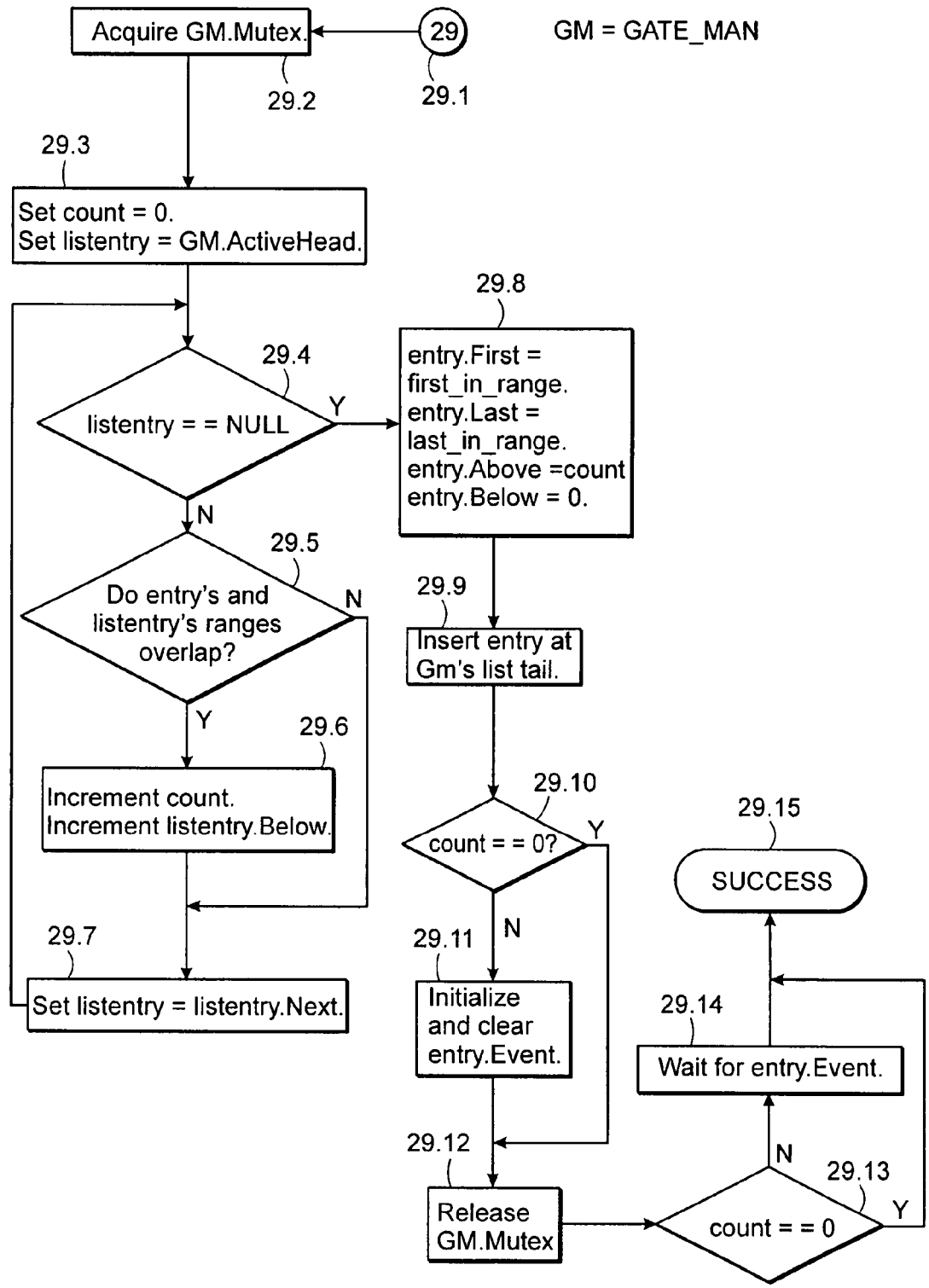
FIG. 29 illustrates a FDO-gate-acquire range process.
Figure 30:
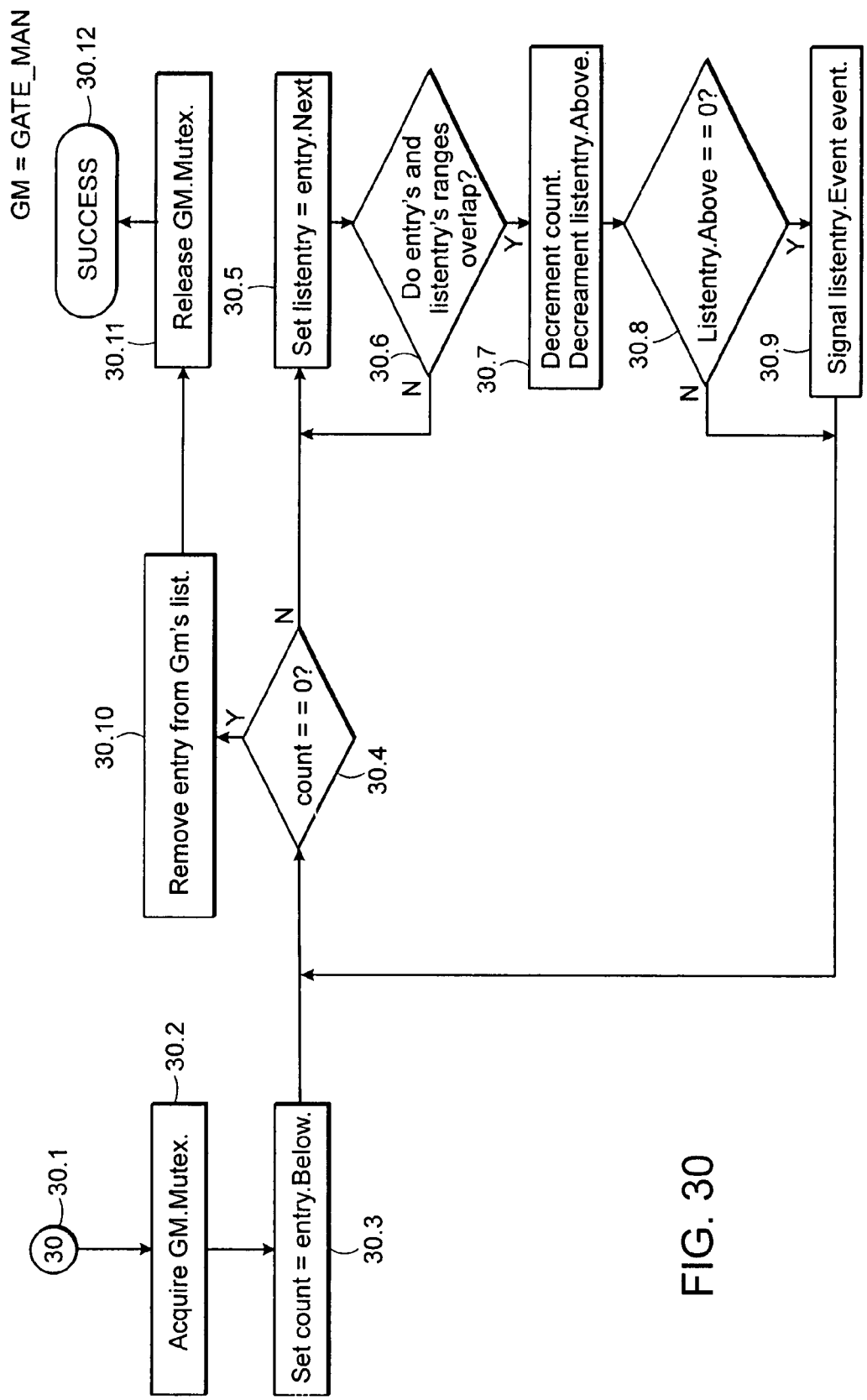
FIG. 30 illustrates a FDO-gate-release range process.

Referring to FIGS. 28-30, a feature of the RAM disk is referred to as the gate mechanism. While this gate mechanism can be used with RAM disks as described above, this mechanism can be used with other types of RAM disk. This mechanism is designed to prevent multiple threads from simultaneously accessing the same region of the RAM disk image—which could result in data corruption—while at the same time avoiding the need to use synchronization objects (events, mutexes, etc.) until necessary or desirable according to some other design criteria. Such avoidance helps maximize the performance of the gating mechanism.

The gate mechanism employs a GATE_MAN object, which, in turn has a list of GATE_ENTRY objects. Preferably, each GATE_ENTRY object represents a single region, or range of contiguous addresses, on the RAM disk. The GATE_MAN object is initialized (FIG. 28), via a routine which is a passed single parameter: a reference (GM) to a GATE_MAN object (28.1). Then, the routine sets the GM.ActiveHead and GM.ActiveTail values to NULL (28.2), initializes the GM.Mutex mutex (28.3), and returns successful (28.4).

Other aspects of a GATE_ENTRY object are the ULONGs Above and Below, and the KEVENT Event. When the GATE_ENTRY object is inserted at the tail of the list maintained in GATE_MAN, the Above value has been set to the total number of GATE_ENTRY objects, already in the list and which contain ranges overlapping the current GATE_ENTRY object. A value of zero means no dependencies, and the thread carrying the GATE_ENTRY object does not wait for access to the range. This is the case of the vast majority of range acquisitions.

As a GATE_ENTRY object's Above value is incremented, the corresponding GATE_ENTRY object's Below value is also incremented, tracking the number of GATE_ENTRY objects dependent upon it. The Above and Below values thus describe the interdependency of GATE_ENTRY items in the list. As the ranges described by the list in the GATE_MAN object are released, their GATE_ENTRY objects decrement their own Below values, and their dependents' Above values. When a dependent's Above value reaches zero, the object is no longer dependent, thus its event is signaled and the waiting thread—carrying the GATE_ENTRY object—is unblocked, able to access the specified range.

When a thread carrying a read or write IRP is dispatched by the operating system to the FDO driver, the FDO's read/write dispatch routine allocates a GATE_MAN object on the stack. Before accessing the RAM disk, the dispatch routine "acquires the range" described by the IRP (FIG. 29). When finished accessing the RAM disk, the routine "releases the range" previously acquired (FIG. 30).

To acquire a range using the gate (FIG. 29), the routine is passed four arguments: a reference (GM) to a GATE_MAN object, a reference (GE) to an unused GATE_ENTRY object, a ULONG First value, and a ULONG Last value (29.1). The latter values describe the range to be acquired in arbitrary address units. In this implementation, the units are sectors, where a sector represents a single contiguously addressable region of 512 bytes, preferably starting at an address of a multiple of 512. As indicated here, the sectors can be rather short in bytes, e.g., no more than about 10 k bytes, rather than longer pages of, e.g., 4 MB.

First, the routine acquires the GM.Mutex mutex (29.2), sets the local value count to zero and the local reference listentry to GM.ActiveHead (29.3). The routine then walks the list of GATE_ENTRYs (29.4-29.7), starting at the list's head (referenced by GM.ActiveHead).

If listentry references a valid entry (29.4), the routine compares the listentry.First and listentry.Last with First and Last values to determine if the two ranges overlap (29.5). If they overlap, the routine increments the local value count, and increments listentry.Below (29.6). In either case, the routine then sets listentry to listentry.Next (29.7), and loops back to walk the next GATE_ENTRY item (29.4).

If listentry does not reference a valid entry (29.4), the routine sets GE.First to First, GE.Last to Last, GE.Above to count, and GE.Below to zero (29.8). GE.Above represents the number of GATE_ENTRY items in the list preceding the current item, and which describe a region overlapping the current entry, GE. GE.Below represents the number of GATE_ENTRY items in the list following the current item, and which describe a region overlapping the current entry, GE. At this time this entry, GE, is the last entry. The routine inserts GE at the tail of the list in GM (29.9).

If the local count is not zero (29.10), the routine initializes and clears the GE.Event (29.11). In either case, the routine now releases the GM.Mutex mutex (29.12). If the local count is zero (29.13), the routine returns successful (29.15). If the local count is not zero (29.13), it waits for the GE.Event event (29.14), and then returns successful (29.15).

The thread waits on the GE.Event (29.14) when it is dependent on GATE_ENTRY objects which have previously acquired a range which overlaps the current one. It anticipates their releasing the range, and finally, signaling the current GATE_ENTRY object's event.

To release a range using the gate (FIG. 30), the routine is passed a reference (GM) to a GATE_MAN object and a reference (GE) to the GATE_ENTRY object which describes the range to be released (30.1). The routine then acquires the GM.Mutex mutex (30.2), and sets the local value count to GE.Below (30.3). The value count now represents the total number of GATE_ENTRY objects following the current entry in the list, and containing ranges which overlap with the current entry's range. The routine now walks the list of GATE_ENTRY items that follow the current entry (30.4-30.9).

If the value count is zero (30.4), the routine removes the current entry from the list in GM (30.10), releases the GM.Mutex mutex (30.11) and returns successful (30.12). If the value count is not zero (30.4), the routine sets the local reference listentry to GE.Next (30.5). It then compares the listentry.First and listentry.Last with GE.First and GE.Last to determine if they overlap (30.6). If the items do not overlap, the routine loops back to the next item (30.5).

If the items do overlap (30.6), the routine decrements the count value and decrements the listentry.Above value (30.7). If this value is now zero (30.8), the routine signals the listentry.Event event (30.9). In either case, the routine loops back to check the local count value (30.4).

As a result of this method, it is not necessary to have locks for each page or other segment of data, but rather access is controlled through tables.

The operating system sends read and write IRPs to the FDO driver's read/write dispatch routine. This routine properly handles the IRPs when they are queued for processing by the bus driver, and when they are not queued and processed entirely by the FDO driver.

When the bus driver processes a queued read or write IRP, it makes a call back to the FDO driver once the disk region described by the IRP is validated (FIG. 31). This callback routine handles both successful bus processing and failed bus processing.

The FDO driver's bus driver callback routine is passed one argument, a reference to an IRP (31.1). If the IRP's status is "success" (31.2), the routine executes the IRP (31.3) and returns successful (31.4). Else, the routine completes the IRP (31.5), and returns successful (31.4).

Figure 32A:
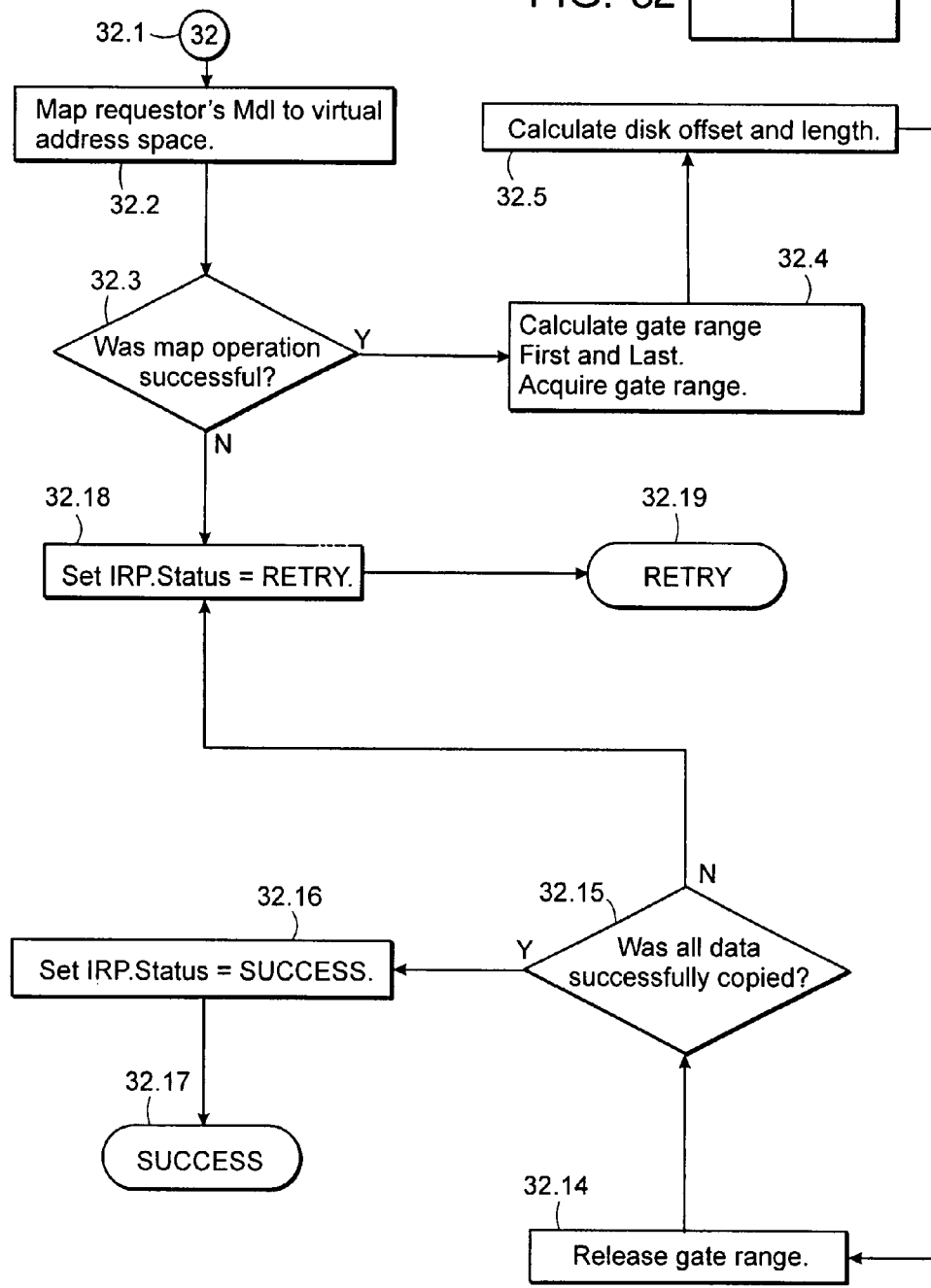
FIG. 32 illustrates another FDO-read/write dispatcher.
Figure 32B:
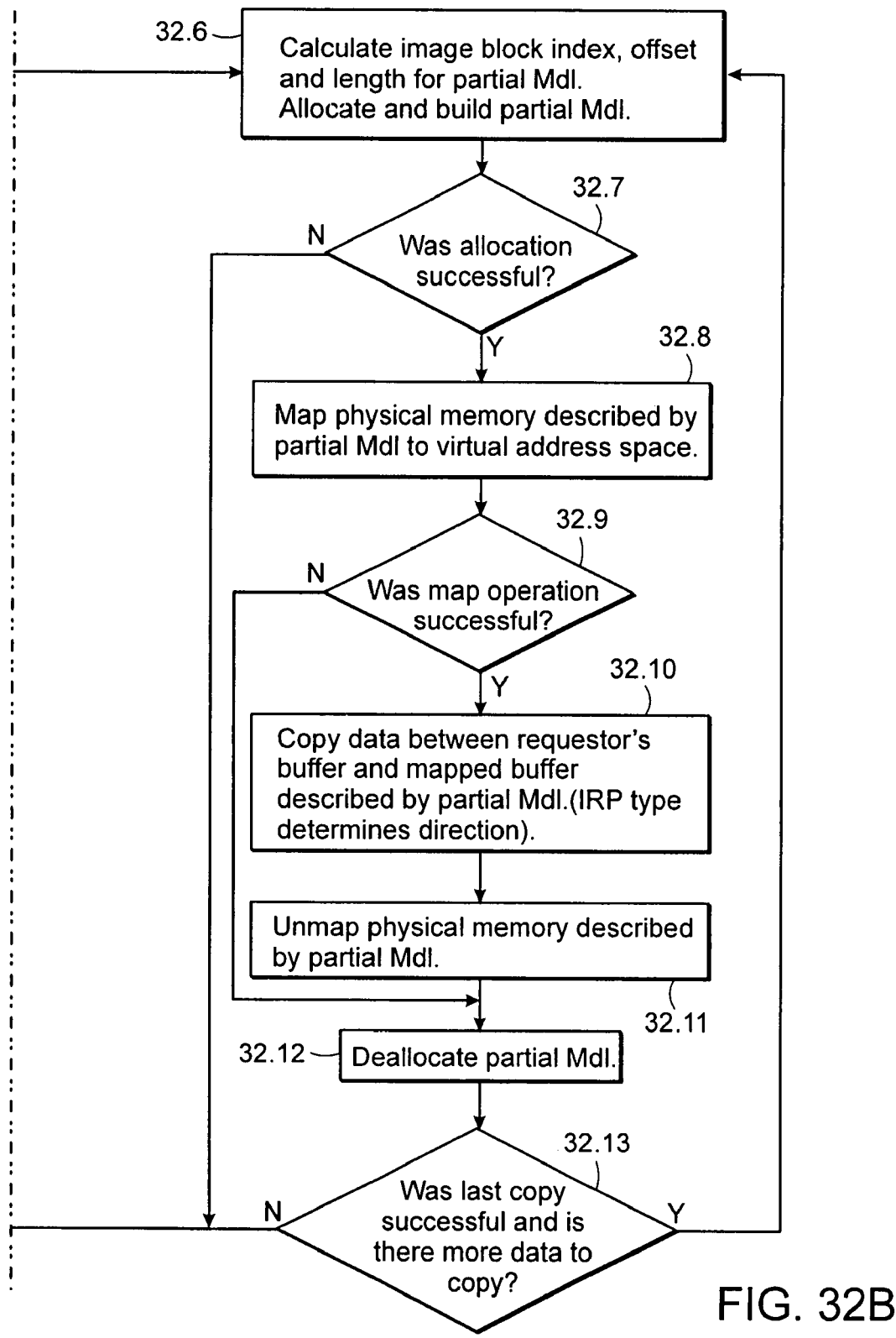

The FDO driver's read/write dispatch routine is illustrated by FIG. 32. The components, sub-systems, and routines provide support so that this routine performs efficiently. Except for synchronization objects that operating system support routines employ, the FDO driver's read/write dispatch routine uses a mutex found in the GATE_MAN object. By allocating, building (from large blocks of allocated physical memory), and mapping partial MDLs in a manner that can be done on-the-fly, this routine can significantly reduce its impact on system resources while improving performance.

The read/write dispatch routine is passed a reference to an IRP, a reference (GM) to a GATE_MAN object, and a reference (MI) to a MEMORY_IMAGE object, representing the RAM disk image (32.1). First, the routine attempts to map the buffer described by the IRP's MDL, to system virtual address space (32.2). If the map operation fails (32.3), the IRP's status is set to "retry" (32.18), and the routine returns "retry" (32.19).

If the map operation was successful (32.3), the routine calculates the gate range First and Last, and acquires the gate range (32.4). It calculates the disk offset and length from IRP values (32.5). The routine will now loop though image blocks to fulfill the IRP request, starting with the first image block corresponding to the IRP's disk offset and length.

The routine calculates the image block's index, offset and length (32.6). The routine attempts to allocate and build a partial Mdl using the aforementioned values (32.6). If the allocation failed (32.7), the routine releases the gate range (32.14), determines that the data was not copied (32.15), sets the IRP's status to "retry" (32.18), and returns "retry" (32.19).

If the allocation was successful (32.7), the routine attempts to map the physical memory described by the partial Mdl to system virtual address space (32.8). If the map operation was successful (32.9), the routine copies the data between the IRP's buffer and the mapped buffer described by the partial Mdl (32.10). The type of IRP (read or write) determines the direction of the copy. The routine then unmaps the physical memory described by the partial IRP (32.11).

If the map operation was successful (and steps 32.10 and 32.11 are executed) or not (32.9), the routine then deallocates and frees the partial Mdl (32.12). If the last copy operation was successful and there is more data to copy from the next image block (32.13), the routine loops back to calculate for the next block (32.6). Otherwise, the routine releases the gate range (32.14). If the data was successfully copied (32.15), it sets the IRP's status to "success" and returns "success". Else, it sets the IRP's status to "retry" and returns "retry".

A computer system for implementing a persistent RAM disk can include a processor for executing instructions, usually residing in a program in main memory. Main memory can be a volatile RAM storage device, and is coupled to the processor by a bus. The processor can is be coupled to a nonvolatile storage device, such as a hard disk storage device. If remote, a storage device can be coupled to the computer system over a data network such as is known to those skilled in the art.

The preceding exemplary embodiments have been provided to illustrate the various inventive concepts presented by the present disclosure. The examples provided should not be read by way of limitation of the underlying concepts, but as enabling the reader to fully understand these concepts. Extensions and modifications, including numerous alternative or equivalent implementations may be carried out as suited for a specific need. In addition, adaptation, modification, and porting to any of the numerous hardware and/or software platforms and technologies is contemplated as part of this disclosure, even if such platforms are not explicitly recited in the above examples.

What is claimed is:

1. A method for restoring a RAM disk in a volatile storage device from a corresponding image file on a nonvolatile storage device while the RAM disk is being populated, during or approximately at the time of operating system boot-up, the method comprising:

creating a RAM disk in the volatile storage device corresponding to an image file in the nonvolatile storage device;

writing data from the image file to the RAM disk; and asynchronously and substantially simultaneously accessing both the image file on the nonvolatile storage device and the RAM disk on the volatile storage device so that the two storage devices are available to the operating system during system boot-up;

wherein both the image file on the nonvolatile storage device and on the RAM disk are available to the operating system in combination for access during both system boot-up or subsequent shutdown, before the RAM disk is fully populated from the image file.

2. The method of claim 1, further comprising maintaining the image file in a viable state for backup purposes at least until the RAM disk is fully restored.

3. The method of claim 2, wherein after the RAM disk is fully populated from the image file after system boot-up, the RAM disk contains the same information the RAM disk had during system shut-down.

4. The method of claim 1, further comprising writing-through data from the RAM disk to the nonvolatile storage device when the RAM disk is in use for both read and write operations.

5. The method of claim 1, wherein both the image file on the nonvolatile storage device and the RAM disk on the volatile storage device are available to the operating system after system boot-up.

6. The method of claim 1, wherein the operating system is allowed access to information belonging in the RAM disk, wherein the information:

(i) is already loaded into the RAM disk on the volatile storage device; or (ii) physically resides in the image file on the nonvolatile storage device pending loading into the RAM disk.

7. The method of claim 1, wherein the RAM disk is populated from the image file in response to a system boot-up.

* * * * *